US010035132B2

United States Patent
(12) United States Patent
Umaba et al.

(10) Patent No.: US 10,035,132 B2
(45) **Date of Patent: *Jul. 31, 2018**

(54) POLYCONDENSATION CATALYST FOR PRODUCING POLYESTER AND METHOD FOR PRODUCING POLYESTER USING THE SAME

(71) Applicant: SAKAI CHEMICAL INDUSTRY CO., LTD., Osaka (JP)

(72) Inventors: Toshikatsu Umaba, Osaka (JP); Hiromitsu Shimizu, Osaka (JP); Kenji Mori, Osaka (JP); Keiichi Tabata, Osaka (JP)

(73) Assignee: SAKAI CHEMICAL INDUSTRY CO., LTD., Osaka (JP)

( * ) Notice: Subject to any disclaimer, the term of this patent is extended or adjusted under 35 U.S.C. 154(b) by 281 days.

This patent is subject to a terminal disclaimer.

(21) Appl. No.: 14/723,634

(22) Filed: May 28, 2015

(65) Prior Publication Data

US 2015/0258530 A1 Sep. 17, 2015

Related U.S. Application Data

(62) Division of application No. 12/086,247, filed as application No. PCT/JP2006/313366 on Jun. 28, 2006, now Pat. No. 9,981,248.

(51) Int. Cl.

| | |
|---|---|
| ***B01J 23/00*** | (2006.01) |
| ***B01J 21/06*** | (2006.01) |
| ***B01J 21/08*** | (2006.01) |
| ***C08G 63/85*** | (2006.01) |
| ***B01J 21/04*** | (2006.01) |
| ***B01J 21/12*** | (2006.01) |
| ***B01J 35/00*** | (2006.01) |
| ***B01J 35/02*** | (2006.01) |
| ***B01J 37/00*** | (2006.01) |
| ***B01J 37/02*** | (2006.01) |
| ***C08G 63/183*** | (2006.01) |
| *B01J 21/14* | (2006.01) |

(52) U.S. Cl.

CPC ............. *B01J 23/007* (2013.01); *B01J 21/04* (2013.01); *B01J 21/063* (2013.01); *B01J 21/066* (2013.01); *B01J 21/08* (2013.01); *B01J 21/12* (2013.01); *B01J 35/0006* (2013.01); *B01J 35/026* (2013.01); *B01J 37/0009* (2013.01); *B01J 37/0244* (2013.01); *C08G 63/183* (2013.01); *C08G 63/85* (2013.01); *B01J 21/14* (2013.01)

(58) Field of Classification Search

CPC ........ B01J 21/04; B01J 21/063; B01J 23/007; B01J 21/06; B01J 21/066; B01J 21/10; B01J 21/12; C08G 63/183

See application file for complete search history.

(56) References Cited

U.S. PATENT DOCUMENTS

| | | | | |
|---|---|---|---|---|
| 5,596,069 | A | 1/1997 | Goodley | |
| 6,107,515 | A | 8/2000 | Yamaguchi et al. | |
| 8,901,029 | B2 * | 12/2014 | Tabata | B01J 21/063 502/350 |
| 2002/0010310 | A1 | 1/2002 | Allen et al. | |
| 2003/0216253 | A1 * | 11/2003 | Wiegner | B01J 21/005 502/208 |

FOREIGN PATENT DOCUMENTS

| | | |
|---|---|---|
| JP | 46-3395 | 1/1971 |
| JP | 49-57092 | 6/1974 |
| JP | 63-243126 | 10/1988 |
| JP | 08-020638 | 1/1996 |
| JP | 2000-178349 | 6/2000 |
| JP | 2001-64377 | 3/2001 |
| JP | 2001-114835 | 4/2001 |
| JP | 2006-188567 | 7/2006 |

* cited by examiner

*Primary Examiner* — Jun Li

(74) *Attorney, Agent, or Firm* — Wenderoth, Lind & Ponack, L.L.P.

(57) ABSTRACT

The invention provides a polycondensation catalyst for producing polyester by an esterification reaction or a transesterification reaction between a dicarboxylic acid or ester-forming derivative thereof and a glycol, wherein the polycondensation catalyst comprises particles of a solid base having on their surfaces either a coat layer of titanic acid in an amount of from 0.1 to 50 parts by weight in terms of $TiO_2$ per 100 parts by weight of the solid base, or an inner coat layer of an oxide of at least one element selected from silicon, aluminum and zirconium or a composite oxide of at least two elements selected from silicon, aluminum and zirconium in an amount of from 1 to 20 parts by weight per 100 parts by weight of the solid base and an outer coat layer of titanic acid in an amount of from 0.1 to 50 parts by weight in terms of $TiO_2$ per 100 parts by weight of the solid base, and wherein the solid base is hydrotalcite.

14 Claims, No Drawings

POLYCONDENSATION CATALYST FOR PRODUCING POLYESTER AND METHOD FOR PRODUCING POLYESTER USING THE SAME

TECHNICAL FIELD

The present invention relates to polycondensation catalysts for producing polyester and to methods producing polyester using such polycondensation catalysts.

BACKGROUND ART

Polyesters typified by polyethylene terephthalate, polybutylene terephthalate and polyethylene naphthalate excel in mechanical properties and chemical properties and are used in a wide variety of fields including fibers for clothes and industrial materials, films or sheets for packaging materials or magnetic tapes, bottles, which are hollow molded articles, casings of electric or electronic appliances, and other types of molded articles or components.

Certain representative polyesters, namely, polyesters composed of aromatic dicarboxylic acid components and alkylene glycol components as major constituents, such as polyethylene terephthalate, are produced by first preparing bis(2-hydroxyethyl)terephthalate (BHET) and an oligomer containing the same by an esterification reaction between terephthalic acid and ethylene glycol or transesterification of dimethyl terephthalate and ethylene glycol, and then subjecting them to melt-polycondensation in vacuo at high temperatures in the presence of a polycondensation catalyst.

As such a polycondensation catalyst for producing polyester, antimony trioxide is heretofore widely used as disclosed in JP 46-3395 B. Antimony trioxide is a catalyst which is inexpensive and is of excellent catalytic activities, however, it has some problems. For example, antimony metal is formed while it is used in polycondensation thereby making the resulting polyester darkened, or the resulting polyester is contaminated with foreign substances. In addition, antimony trioxide is inherently poisonous. In recent years, therefore, development of catalysts free of antimony has been awaited.

For example, a catalyst composed of a germanium compound is known as a catalyst which has an excellent catalytic activity and which can provide polyester excellent in hue and thermal stability. This catalyst, however, is problematic in that it is very expensive and that the catalyst content in a reaction system changes with time and it becomes difficult to control the polymerization because the catalyst is easily distilled off from the reaction system during the polymerization.

On the other hand, as disclosed in JP 46-3395 B and JP 49-57092 A, it is already known that titanium compounds such as glycol titanate and titanium alkoxide also can be used as a polycondensation catalyst for producing polyester by transesterification of dimethyl terephthalate and ethylene glycol. For example, according to U.S. Pat. No. 5,596,069, polycondensation catalysts comprising tetraalkoxy titanate are known. They, however, have problems in that the resulting polyester is liable to be colored due to thermal degradation during the melt-molding thereof.

In recent years, many methods for producing high-quality polyester at high productivity using a titanium compound as a polycondensation catalyst have been proposed. For example, as disclosed in JP 2001-064377 A and JP 2001-114885 A, a solid titanium compound obtained by first preparing a hydroxide of titanium by hydrolysis of titanium halide or titanium alkoxide and then dehydrating and drying the hydroxide by heating it at a temperature of from 30 to 350° C. has been proposed as a polycondensation catalyst.

Some of the heretofore known polycondensation catalysts composed of titanic acid, including the above-mentioned titanium compounds, have high polymerization activities per unit weight of metal. However, in many cases, there is a tendency that such a catalyst exhibits a high polymerization activity, but the resulting polyester is liable to be colored due to thermal degradation during its melt-molding. There is also a tendency that the resulting polyester is poor in transparency.

DISCLOSURE OF THE INVENTION

The present inventors have intensively studied in order to solve the above-mentioned problems involved in the conventional polycondensation catalysts for producing polyester. As a result, they have reached the present invention by finding that when a coat layer of titanic acid is formed on the surface of solid base particles and such a product is used as a polycondensation catalyst for producing polyester, decomposition of polyester is controlled during the production of polyester and high-molecular-weight polyester is formed at a high polymerization activity and the polyester hardly suffers coloring due to thermal degradation during its melt-molding.

Therefore, it is an object of the invention to provide a novel polycondensation catalyst for producing polyester which exhibit high catalytic activities and provide polyester with excellent hue or color tone and transparency even in the absence of antimony. It is also an object of the invention to provide a method for producing polyester using such a polycondensation catalyst.

The invention provides a polycondensation catalyst for producing polyester by an esterification reaction or transesterification reaction between a dicarboxylic acid or ester-forming derivative thereof and glycol, wherein the polycondensation catalyst comprises particles of solid base having on their surfaces a coat layer of titanic acid in an amount of from 0.1 to 50 parts by weight in terms of $TiO_2$ per 100 parts of the solid base.

The polycondensation catalyst is obtainable by adding an aqueous solution of titanium halide and an aqueous alkaline solution to an aqueous slurry of particles of a solid base at a temperature of from 25 to 40° C. so that the aqueous slurry has a pH of 5 to 12, thereby forming a surface coat comprising titanic acid on the surface of the particles of the solid base, drying the particles of the solid base with the surface coat, and pulverizing the particles.

The invention further provides a polycondensation catalyst for producing polyester by an esterification reaction or transesterification reaction between a dicarboxylic acid or an ester-forming derivative thereof and a glycol, wherein the polycondensation catalyst comprises particles of a solid base having on their surfaces an inner coat layer of an oxide of at least one element selected from silicon, aluminum and zirconium or a composite oxide of at least two elements selected from silicon, aluminum and zirconium in an amount of from 1 to 20 parts by weight per 100 parts by weight of the solid base, and an outer coat layer of titanic acid in an amount of from 0.1 to 50 parts by weight in terms of $TiO_2$ per 100 parts by weight of the solid base.

Among the above-mentioned catalysts, a catalyst having an inner coat layer of an oxide of at least one element selected from silicon and aluminum or a composite oxide of silicon and aluminum and an outer coat layer of titanic acid on the surface of the particles of the solid base is obtainable by, while maintaining an aqueous slurry of the particles of the solid base at a temperature of from 5 to 100° C., adding to the aqueous slurry a water-soluble silicate in an amount of from 1 to 20 parts by weight in terms of $SiO_2$ per 100 parts by weight of the solid base and/or a water-soluble aluminate in an amount of from 1 to 20 parts by weight in terms of $Al_2O_3$ per 100 parts by weight of the solid base and an acid, thereby forming an inner coat layer of an oxide of at least one element selected from silicon and aluminum or a composite oxide of silicon and aluminum on the surface of the particles of the solid base; adding an aqueous solution of titanium halide and an aqueous alkaline solution to the resulting aqueous slurry of the particles of the solid base at a temperature of from 25 to 40° C. so that the aqueous slurry has a pH of 5 to 12, thereby forming an outer coat layer of titanic acid on the inner coat layer; and drying and pulverizing the particles of the solid base with the inner and outer coat layers.

Among the above-mentioned catalysts, a catalyst having an inner coat layer of an oxide of zirconium and an outer coat layer of titanic acid on the surface of the particles of the solid base is obtainable by, while maintaining an aqueous slurry of the particles of the solid base at a temperature of from 5 to 100° C., adding to the aqueous slurry a water-soluble zirconium salt in an amount of from 1 to 20 parts by weight in terms of $ZrO_2$ per 100 parts by weight of the solid base and an alkali, thereby forming an inner coat layer of an oxide of zirconium on the surface of the particles of the solid base; adding an aqueous solution of titanium halide and an aqueous alkaline solution to the resulting aqueous slurry of the particles of the solid base at a temperature of from 25 to 40° C. so that the aqueous slurry has a pH of 5 to 12, thereby forming an outer coat layer of titanic acid on the inner coat layer; and drying and pulverizing the particles of the solid base with the inner and outer coat layers.

Among the above-mentioned catalysts, a catalyst having an inner coat layer of a composite oxide of zirconium and at least one element selected from silicon and aluminum and an outer coat layer of titanic acid on the surface of the particles of the solid base is obtainable by, while maintaining an aqueous slurry of the particles of the solid base at a temperature of from 5 to 100° C., adding to the aqueous slurry a water-soluble silicate in an amount of from 1 to 20 parts by weight in terms of $SiO_2$ per 100 parts by weight of the solid base and/or a water-soluble aluminate in an amount of from 1 to 20 parts by weight in terms of $Al_2O_3$ per 100 parts by weight of the solid base, and in addition a water-soluble zirconium salt in an amount of from 1 to 20 parts by weight per 100 parts by weight of the solid base, thereby forming an inner coat layer of a composite oxide of zirconium and at least one element selected from silicon and aluminum on the surface of the particles of the solid base; adding an aqueous solution of titanium halide and an aqueous alkaline solution to the resulting aqueous slurry of the particles of the solid base at a temperature of from 25 to 40° C. so that the pH of the aqueous slurry becomes 5 to 12, thereby forming an outer coat layer of titanic acid on the inner coat layer; and drying and pulverizing the particles of the solid base with the inner and outer coat layers.

According to the invention, the solid base in the polycondensation catalysts mentioned above is preferably magnesium hydroxide or hydrotalcite.

The invention further provides a method for producing polyester comprising subjecting a dicarboxylic acid or an ester-forming derivative thereof and a glycol to an esterification reaction or a transesterification reaction in the presence of such a polycondensation catalyst mentioned above.

In particular, the invention provides, as a preferred embodiment, a method for producing polyester comprising preparing an oligomer comprising a bis(hydroxyalkyl) ester of an aromatic dicarboxylic acid by an esterification reaction or a transesterification reaction of the aromatic dicarboxylic acid or an ester-forming derivative thereof and an alkylene glycol, and subsequently melt-polycondensing the oligomer under a high vacuum at a high temperature in the presence of such a polycondensation catalyst mentioned above.

Furthermore, the titanium halide used in the preparation of the polycondensation catalyst according to the invention mentioned above is preferably titanium tetrachloride.

BEST MODE FOR CARRYING OUT THE INVENTION

A first polycondensation catalyst for producing polyester by an esterification reaction or transesterification reaction between a dicarboxylic acid or an ester-forming derivative thereof and a glycol according to the invention is such that it comprises particles of a solid base having on their surfaces a coat layer of titanic acid in an amount of from 0.1 to 50 parts by weight in terms of $TiO_2$ per 100 parts of the solid base.

A second polycondensation catalyst for producing polyester by an esterification reaction or transesterification reaction between a dicarboxylic acid or an ester-forming derivative thereof and a glycol according to the invention is such that it comprises particles of a solid base having on their surfaces an inner coat layer of an oxide of at least one element selected from silicon, aluminum and zirconium or a composite oxide of at least two elements selected from silicon, aluminum and zirconium in an amount of from 1 to 20 parts by weight per 100 parts by weight of the solid base and an outer coat layer of titanic acid in an amount of from 0.1 to 50 parts by weight in terms of $TiO_2$ per 100 parts of the solid base.

In the invention, examples of the solid base include oxides, hydroxides or various composite oxides of alkali metals or alkaline earth metals, and oxides or composite oxides of aluminum, zinc, lanthanum, zirconium, thorium and the like. Such oxides and composite oxides may be replaced partially by salts such as carbonates. Therefore, in the invention, more specific examples of the solid base include oxides and hydroxides of magnesium, calcium, strontium, barium, aluminum, zinc and the like, e.g., magnesium hydroxide, calcium oxide, strontium oxide, barium oxide, zinc oxide and the like, and composite oxides such as hydrotalcite. In particular, magnesium hydroxide or hydrotalcite is preferably used according to the invention as a solid base.

In the invention, titanic acid is a hydrated titanium oxide represented by the general formula $$TiO_2.nH_2O$$

wherein n is a number satisfying $0<n\leq 2$. Such a titanic acid can be obtained, for example, by alkaline hydrolysis of a certain kind of titanium compound as described later.

First, the first polycondensation catalyst according to the invention is described. In the first polycondensation catalyst according to the invention, when the amount of the coat layer of titanic acid is less than 0.1 parts by weight in terms of $TiO_2$, per 100 parts by weight of the solid base, the resulting polycondensation catalyst exhibits a low polymerization activity and fails to provide high-molecular-weight polyester with satisfactory productivity. On the other hand, when the amount of the coat layer of titanic acid is more than 50 parts by weight in terms of $TiO_2$, per 100 parts by weight of the solid base, decomposition of polyester occurs easily during the production of the polyester and coloring of the resulting polyester due to its thermal degradation occurs easily during the melt-molding of the polyester.

Such a first polycondensation catalyst according to the invention can be obtained by, while maintaining an aqueous slurry of the particles of a solid base at a temperature of from 5 to 100° C., preferably from 25 to 40° C., adding to the aqueous slurry a titanium compound in an amount of from 0.1 to 50 parts by weight in terms of $TiO_2$ per 100 parts by weight of the solid base, and then adding an alkali to the resulting mixture to hydrolyze the titanium compound at a pH of 5 to 12, preferably at a pH of 7 to 10, thereby forming a coat layer of titanic acid, and then drying and pulverizing the particles of the solid base with the coat layer. The temperature for the drying is preferably within the range of from 60 to 180° C., and particularly preferably within the range of from 100 to 130° C.

The first polycondensation catalyst according to the invention can also be obtained by another method. It can be obtained by, while maintaining an aqueous slurry of a solid base at a temperature of from 5 to 100° C., preferably from 25 to 40° C., adding to the aqueous slurry a titanium compound in an amount of from 0.1 to 50 parts by weight in terms of $TiO_2$ per 100 parts by weight of the solid base and an alkali in an amount almost equivalent to that of the titanium compound, and if needed, adding additional alkali to hydrolyze the titanium compound at a pH of 5 to 12, preferably at a pH of 7 to 10, thereby forming a coat layer of titanic acid, and then drying at a temperature from 60 to 180° C. and pulverizing the particles of the solid base with the coat layer.

In the preparation of the polycondensation catalyst of the invention, examples of the titanic compound which can form a titanic acid coat by the alkaline hydrolysis include titanium halides such as titanium tetrachloride, titanates such as titanylammonium oxalate, and titanium alkoxides such as titanium tetraisopropoxide. The titanic compound, however, is not limited to these examples. Examples of the alkali used for the hydrolysis include ammonia and sodium hydroxide, but the alkali also is not limited to these examples.

In the first polycondensation catalyst according to the invention, the solid base is preferably magnesium hydroxide or hydrotalcite. Therefore, one of the preferred first polycondensation catalysts according to the invention is such that it comprises magnesium hydroxide particles having on their surfaces a coat layer of titanic acid in an amount of from 0.1 to 50 parts by weight in terms of $TiO_2$ per 100 parts by weight of magnesium hydroxide. Another one of the preferred first polycondensation catalysts according to the invention is such that it comprises hydrotalcite particles having on their surfaces a coat layer of titanic acid in an amount of from 0.1 to 50 parts by weight in terms of $TiO_2$ per 100 parts by weight of hydrotalcite.

The slurry of the magnesium hydroxide used for the preparation of the polycondensation catalyst comprising magnesium hydroxide particles having on their surfaces a coat layer of titanic acid among the preferred first polycondensation catalysts mentioned above refers to, for example, a slurry obtained by neutralizing an aqueous solution of a water-soluble magnesium salt such as magnesium chloride and magnesium nitrate with an alkali such as sodium hydroxide and ammonia to precipitate magnesium hydroxide, or a slurry obtained by dispersing magnesium hydroxide particles in an aqueous medium. When an aqueous slurry of magnesium hydroxide is obtained by neutralizing an aqueous solution of a water-soluble magnesium salt with an alkali, the aqueous solution of the water-soluble magnesium salt and the alkali may be subjected to simultaneous neutralization or alternatively neutralization may be conducted by adding one to the other.

The above-mentioned magnesium hydroxide particles may be derived from any source. For example, they may be powder obtained by pulverizing natural ore or powder obtained by neutralizing an aqueous magnesium salt solution with an alkali.

The hydrotalcite used for the preparation of the polycondensation catalyst comprising hydrotalcite particles having on their surfaces a coat layer of titanic acid among the preferred first polycondensation catalysts is preferably represented by the following general formula (I):

$$M^{2+}_{1-x}M^{3+}_{x}(OH^-)_2A^{n-}_{x/n}\cdot mH_2O \quad (I)$$

wherein $M^{2+}$ denotes at least one divalent metal ion selected from $Mg^{2+}$, $Zn^{2+}$ and $Cu^{2+}$; $M^{3+}$ denotes at least one trivalent metal ion selected from $Al^{3+}$, $Fe^{3+}$ and $Ti^{3+}$; $A^{n-}$ denotes at least one anion selected from $SO_4^{2-}$, $Cl^-$, $CO_3^{2-}$ and $OH^-$; n denotes the valence of the anion; x is a number satisfying $0<x<0.5$; and m is a number satisfying $0\leq m<2$.

In particular, in the invention, a hydrotalcite in which $M^{2+}$ is $Mg^{2+}$, $M^{3+}$ is $Al^{3+}$ and $A^{n-}$ is $CO_3^{2-}$, i.e., one represented by the general formula (II) is preferably used:

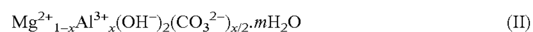

$$Mg^{2+}_{1-x}Al^{3+}_{x}(OH^-)_2(CO_3^{2-})_{x/2}\cdot mH_2O \quad (II)$$

wherein x and m have meanings the same as those mentioned above. Although such a hydrotalcite can be obtained easily as a product in the market, it can also be produced, if necessary, by a conventionally known method, e.g. a hydrothermal method, using proper materials.

In the invention, for example, the aqueous slurry of magnesium hydroxide or hydrotalcite means an aqueous solution in which the dispersion medium of the slurry is water or an aqueous solution containing a small amount of water-soluble organic solvent; the aqueous solution means an aqueous solution in which the solvent of the solution is water or an aqueous solution containing a small amount of water-soluble organic solvent; and the aqueous medium means water or an aqueous solution containing a small amount of water-soluble organic solvent.

In the invention, the aqueous slurry of hydrotalcite means a slurry obtained by dispersing the aforementioned hydrotalcite in the aforementioned aqueous medium.

Next, the second polycondensation catalyst according to the invention is described. In the second polycondensation catalyst according to the invention, when the amount of the inner coat layer of an oxide of at least one element selected from silicon, aluminum and zirconium or a composite oxide of at least two elements selected from silicon, aluminum and zirconium is less than 1 part by weight per 100 parts by weight of the solid base, the resulting polycondensation catalyst has a high polymerization activity, but the hue of the resulting polyester is not improved. On the other hand, when the amount of the inner coat layer is more than 20 parts by weight in terms of an oxide per 100 parts by weight of the solid base. the polymerization activity of the resulting polycondensation catalyst decreases undesirably.

When the amount of the outer coat layer of titanic acid is less than 0.1 parts by weight in terms of $TiO_2$, per 100 parts by weight of the solid base, the resulting polycondensation catalyst exhibits a low polymerization activity and fails to provide high-molecular-weight polyester with satisfactory productivity. On the other hand, when the amount of the outer coat layer of titanic acid is more than 50 parts by weight in terms of $TiO_2$, per 100 parts by weight of the solid base, decomposition of polyester occurs easily during the production of the polyester and coloration of the resulting polyester due to its thermal degradation occurs easily during the melt-molding of the polyester.

Among such second polycondensation catalysts according to the invention, a polycondensation catalyst having an inner coat layer of an oxide of at least one element selected from silicon and aluminum or a composite oxide of silicon and aluminum on the surface of the particles of a solid base and an outer coat layer of titanic acid on the inner coat layer can be obtained by, while maintaining an aqueous slurry of the particles of the solid base at a temperature of from 5 to 100° C., preferably from 30 to 60° C., adding to the aqueous slurry a water-soluble silicate in an amount of from 1 to 20 parts by weight in terms of $SiO_2$ per 100 parts by weight of the solid base and/or a water-soluble aluminate in an amount of from 1 to 20 parts by weight in terms of $Al_2O_3$ per 100 parts by weight of the solid base, further adding an acid to neutralize the slurry so that it has a pH of 7 to 12, preferably a pH of 8 to 9, and washing with water, thereby forming an inner coat layer of an oxide of at least one element selected from silicon and aluminum or a composite oxide of silicon and aluminum on the surface of the particles of the solid base, and then, while maintaining the thus obtained aqueous slurry of the particles of the solid base at a temperature of from 5 to 100° C., preferably from 25 to 40° C., adding to the aqueous slurry a titanium compound in an amount of from 0.1 to 50 parts by weight in terms of $TiO_2$ per 100 parts by weight of the solid base, and adding an alkali to the resulting mixture to hydrolyze the slurry at a pH of 5 to 12, preferably at a pH of 7 to 10, thereby forming an outer coat layer of titanic acid on the inner coat layer, and then drying and pulverizing the particles of the solid base having the inner coat layer and the outer coat layer.

A polycondensation catalyst having an inner coat layer of a zirconium oxide on the surface of particles of a solid base and an outer coat layer of titanic acid on the inner coat layer can be obtained in a method similar to the above. Namely, the method comprises by, while maintaining an aqueous slurry of the particles of a solid base at a temperature of from 5 to 100° C., preferably from 30 to 60° C., adding to the aqueous slurry a water-soluble zirconium salt in an amount of from 1 to 20 parts by weight in terms of $ZrO_2$ per 100 parts by weight of the solid base and an alkali to neutralize the slurry so that it has a pH of 7 to 12, preferably a pH of 8 to 9, and washing with water, thereby forming an inner coat layer of a zirconium oxide on the surface of the particles of the solid base; then, treating the thus obtained aqueous slurry of the particles of the solid base in a manner similar to the above, thereby forming an outer coat layer of titanic acid on the inner coat layer; and drying and pulverizing the slurry.

Further, a polycondensation catalyst having an inner coat layer of a composite oxide of zirconium and at least one element selected from silicon and aluminum on the surface of particles of a solid base and an outer coat layer of titanic acid on the inner coat layer can be obtained in a method similar to the above. Namely, the method comprises by, while maintaining an aqueous slurry of the particles of a solid base at a temperature of from 5 to 100° C., preferably from 30 to 60° C., adding to the aqueous slurry a water-soluble silicate in an amount of from 1 to 20 parts by weight in terms of $SiO_2$ per 100 parts by weight of the solid base and/or a water-soluble aluminate in an amount of from 1 to 20 parts by weight in terms of $Al_2O_3$ per 100 parts by weight of the solid base, and a water-soluble zirconium salt in an amount of from 1 to 20 parts by weight per 100 parts by weight of the solid base to neutralizing the resulting slurry so that it has a pH of 7 to 12, preferably a pH of 8 to 9; washing the slurry with water, thereby forming an inner coat layer of a complex oxide of zirconium and at least one element selected from silicon and aluminum on the surface of the particles of the solid base; then treating the thus obtained aqueous slurry of the particles of the solid base in a manner similar to the above, thereby forming an outer coat layer of titanic acid on the inner coat layer; and drying and pulverizing the slurry.

In the preparation of the above-mentioned polycondensation catalyst according to the invention, the temperature at which an outer coat layer of titanic acid is dried after its formation on an inner coat layer is preferably within the range of from 60 to 180° C., and particularly preferably within the range of from 100 to 130° C.

The second polycondensation catalyst according to the invention may be prepared by another method. That is, it can be obtained by forming an inner coat layer of an oxide of at least one element selected from silicon, aluminum and zirconium or a composite oxide of at least two elements selected from silicon, aluminum and zirconium on the surface of particles of a solid base, and then, while maintaining an aqueous slurry of such particles of the solid base at 5 to 100° C., preferably 25 to 40° C., adding to the aqueous slurry the aforesaid titanium compound in an amount of from 0.1 to 50 parts by weight in terms of $TiO_2$ per 100 parts by weight of the solid base and an alkali in an amount almost equivalent to that of the titanium compound, and if necessary, further adding an alkali to conduct hydrolysis at a pH of 5 to 12, preferably at a pH of 7 to 10, thereby forming an outer coat layer of titanic acid on the inner coat layer above-mentioned, and thereafter drying and pulverizing the particles at 60 to 180° C.

Examples of the water-soluble silicate for forming the above-mentioned inner coat layer include sodium silicate and potassium silicate. Examples of the water-soluble aluminate for forming the above-mentioned inner coat layer include sodium aluminate and potassium aluminate. Examples of the water-soluble zirconium salt for forming the above-mentioned inner coat layer include zirconium oxychloride and zirconium trichloride. They, however, are not limited to the examples listed above.

Examples of the titanic compound to form a coat of titanic acid coat as an outer coat layer include titanium halides such as titanium tetrachloride, titanates such as titanylammonium oxalate, and titanium alkoxides such as titanium tetraisopropoxide. The titanic compound, however, is not limited to these examples.

Examples of the alkali for use in the hydrolysis include ammonia and sodium hydroxide, but the alkali also is not limited to these examples.

The method for producing polyester according to the invention comprises subjecting a dicarboxylic acid or an ester-forming derivative thereof and a glycol to an esterification reaction or a transesterification reaction in the presence of the first or second polycondensation catalysts described above.

In the invention, examples of the dicarboxylic acid include aliphatic dicarboxylic acids exemplified by succinic acid, glutaric acid, adipic acid and dodecanedicarboxylic acid and their ester-forming derivatives such as dialkyl esters; and aromatic dicarboxylic acids exemplified by terephthalic acid, isophthalic acid and naphthalene dicarboxylic acid and their ester-forming derivatives such as dialkyl esters. In the present invention, examples of the glycol include ethylene glycol, propylene glycol, diethylene glycol, triethylene glycol, butylene glycol and 1,4-cyclohexanedimethanol.

Among the examples provided above, for example, aromatic dicarboxylic acids such as terephthalic acid, isophthalic acid and naphthalene dicarboxylic acid are preferably used as the dicarboxylic acid; and alkylene glycols such as ethylene glycol, propylene glycol and butylene glycol are preferably used as the glycol.

Therefore, in the invention, specific examples of preferred polyesters include polyethylene terephthalate, polybutylene terephthalate, polypropylene terephthalate, polyethylene naphthalate, polybutylene naphthalate, polypropylene naphthalate and poly(1,4-cyclohexane dimethylene terephthalate).

In the present invention, however, the neither dicarboxylic acid or its ester-forming derivative nor the glycol or its ester-forming derivative is limited to the examples listed above. Further, the resulting polyester is not limited to the examples shown above.

In general, polyester represented by polyethylene terephthalate has been produced by any of the following methods: a method comprising producing a low-molecular-weight oligomer containing the aforementioned BHET by a direct esterification of a dicarboxylic acid represented by terephthalic acid and a glycol represented by ethylene glycol, and subjecting the oligomer to melt-polycondensation in the presence of a polycondensation catalyst under a high vacuum at a high temperature to yield polyester with a desired molecular weight; and a method comprising producing, like the foregoing method, a low-molecular-weight oligomer containing the aforementioned BHET by a transesterification of a dialkyl terephthalate represented by dimethyl terephthalate and a glycol represented by ethylene glycol, and subjecting the oligomer to melt-polycondensation in the presence of a polycondensation catalyst under a high vacuum at a high temperature to yield polyester with a desired molecular weight.

Also in the invention, polyester having a desired molecular weight can be obtained by producing a low-molecular-weight oligomer containing the foregoing BHET by the above-mentioned direct esterification reaction or transesterification reaction, and then subjecting the oligomer to melt-polycondensation in the presence of the first or the second polycondensation catalyst of the invention under a high vacuum at a high temperature in the conventionally known manner as described above.

For example, polyethylene terephthalate is produced as follows. In accordance with an ordinary method, as conventionally known, a low-molecular-weight oligomer containing BHET can be obtained by feeding dimethyl terephthalate and ethylene glycol together with a catalyst such as calcium acetate into a reactor, heating them under a normal pressure to react them together at a reflux temperature while distilling off methanol from the reaction system. The degree of polymerization of the oligomer is usually up to about 10. If necessary, the reaction may be conducted under pressure. The reaction can be traced by measuring the amount of methanol distilled. The esterification ratio is usually about 95%.

When a direct esterification reaction is employed, a low-molecular-weight oligomer containing BHET can be obtained by feeding terephthalic acid and ethylene glycol into a reactor and heating them, if necessary under pressure, while distilling off the water formed. In the direct esterification reaction, it is preferable to add a previously prepared low-molecular-weight oligomer containing BHET together with raw materials into a reactor and carry out the direct esterification reaction in the presence of the low-molecular-weight oligomer.

Subsequently, the thus obtained low-molecular-weight oligomer is transferred to a polymerization reactor and is heated under reduced pressure to a temperature not lower than the melting point of polyethylene terephthalate (typically 240 to 280° C.). Thus, the oligomer is subjected to melt-polycondensation while unreacted ethylene glycol and ethylene glycol resulting from the reaction are distilled off from the reaction system under monitoring of the viscosity of the molten reactants. According to necessity, the polycondensation reaction may be carried out by using a plurality of reactors and changing the reaction temperature and pressure optimally in each reactor. When the viscosity of the reaction mixture reaches a predetermined value, the pressure reduction is stopped and the pressure in the polymerization reactor is returned to a normal pressure with nitrogen gas. Then, the resulting polyester is discharged from the reactor, for example, in the form of strand, cooled in water, and cut to form pellets. According to the invention, polyester having an intrinsic viscosity [η] of from 0.4 to 1.0 dL/g can be obtained in this way.

The first or second polycondensation catalysts for producing polyester of the invention may be added to a reaction system when direct esterification reaction or transesterification reaction for the production of the oligomer containing BHET is carried out, or alternatively may be added to the reaction system when a low-molecular-weight oligomer is further subjected to polycondensation reaction after the oligomer is obtained. The polycondensation catalyst of the invention may be added in the form of powder to a reaction system, or alternatively may be added to a reaction system after being dispersed in glycol which is used as one of the raw materials. However, since the polycondensation catalysts of the invention can be dispersed easily in glycol, especially in ethylene glycol, it is preferably added to a reaction system when direct esterification reaction or transesterification reaction for the production of the oligomer containing BHET is carried out.

Either the first or the second polycondensation catalyst of the invention is used usually in an amount within the range of from $1\times10^{-5}$ to $1\times10^{-1}$ parts by mol per 100 parts by mol of the dicarboxylic acid used or its ester-forming derivative. When the amount of the polycondensation catalyst of the invention is less than $1\times10^{-5}$ parts by mol per 100 parts by mol of the dicarboxylic acid used or its ester-forming derivative, the catalyst activity is not high enough and therefore it may be impossible to obtain a desired high-molecular-weight polyester. On the other hand, when it is more than $1\times10^{-1}$ parts by mol, the resulting polyester may be poor in thermal stability.

The polycondensation catalyst of the invention exhibit catalyst activity in solid state polymerization and solution polymerization as well as melt polymerization. In each case, therefore, the catalyst can be used for the production of polyester.

The polycondensation catalysts of the invention contain no antimony as an ingredient. Therefore, it does not make resulting polyesters darkened or it does not contaminate resulting polyesters as foreign substances. In addition, it has catalyst activity equal to or higher than those of catalysts containing antimony as an ingredient and can provide polyesters with excellent hue and transparency. Moreover, the polycondensation catalyst of the invention is not poisonous and hence safe.

In the production of polyester by an esterification reaction or transesterification reaction of a dicarboxylic acid or its ester-forming derivative and a glycol, it is presumed that the acidic catalysis of titanic acid is to coordinate, as a Lewis acid, to a carbonyl group of a dicarboxylic acid or its ester-forming derivative to make the attack of the glycol to the carbonyl carbon easy and simultaneously accelerate the dissociation of glycol to increase the nucleophilicity thereof. However, when the acidic catalysis is too strong, undesirable side reactions probably occur to cause a decomposition reaction or coloration of the resulting polyester.

It is presumed that by use of the first polycondensation catalyst of the invention, a coat layer of titanic acid is formed on the surface of particles of solid base to render the acidic catalysis of the titanic acid moderate and, as a result, a high-molecular-weight polyester excellent in hue and transparency is obtained.

When using the second polycondensation catalyst of the invention, an excessive basic catalysis of solid base is suppressed by forming an inner coat layer of an oxide of at least one element selected from silicon, aluminum and zirconium or a composite oxide of at least two elements selected from silicon, aluminum and zirconium and an outer coat layer of titanic acid on the surface of particles of the solid base. In addition, it is presumed that the acidic catalysis of titanic acid is further improved and, as a result, high-molecular-weight polyester excellent in hue and transparency is provided.

According to the invention, however, in the production of polyester, conventionally known polycondensation catalysts, for example, those comprised of compounds of antimony, germanium, titanium, tin, aluminum and the like may be used together unless the merit of use of the polycondensation catalyst of the invention is affected. Moreover, alkali metal compounds may, according to demand, be used together and phosphoric acid compounds may also be used together for the improvement in thermal stability.

INDUSTRIAL APPLICABILITY

In the production of polyester by an esterification reaction or transesterification reaction of a dicarboxylic acid or its ester-forming derivative and a glycol, the use of a polycondensation catalyst for producing polyester according to the invention makes it possible to obtain a high-molecular-weight polyester excellent in hue and transparency at a high polymerization activity without making the polyester darkened or contaminating the polyester with foreign substances or causing decomposition of the polyester during the production of polyester.

EXAMPLES

In the following Examples and Comparative Examples, the intrinsic viscosity of polyester obtained was measured in accordance with ISO 1628-1, and the hue was measured using a 45° diffusion type color difference meter (SC2-CH, manufactured by Suga Test Instruments Co., Ltd.). The haze value of polyester obtained was measured according to JIS K-7136 using a 5-mm thick plate. The plate was a rectangular plate with steps prepared by heating and melting polyester at 280° C. and molding.

Production of Magnesium Hydroxide and Hydrotalcite

Reference Example 1

Preparation of Aqueous Slurry of Magnesium Hydroxide

5 L of water was placed in a reactor, and then 16.7 L of 4 mol/L aqueous solution of magnesium chloride and 8.4 L of 14.3 mol/L aqueous solution of sodium hydroxide were added simultaneously thereto under stirring. Thereafter, a hydrothermal reaction was conducted at 170° C. for 0.5 hours.

The thus obtained magnesium hydroxide was collected by filtration and washed with water. The resulting cake was resuspended in water to yield an aqueous slurry of magnesium hydroxide (123 g/L).

Reference Example 2

Preparation of Aqueous Slurry of Hydrotalcite

A mixed solution of 2.6 L of 3.8 mol/L aqueous solution of magnesium sulfate and 2.6 L of 0.85 mol/L aqueous solution of aluminum sulfate and a mixed solution of 2.8 L of 9.3 mol/L aqueous solution of sodium hydroxide and 2.6 L of 2.54 mol/L aqueous solution of sodium carbonate were added simultaneously to a reactor under stirring. Thereafter, a hydrothermal reaction was conducted at 180° C. for 2 hours. After completion of the reaction, the resulting slurry was filtered, washed with water, dried and pulverized. Thus, hydrotalcite having a composition $Mg_{0.7}Al_{0.3}(OH)_2(CO_3)_{0.15}.0.48H_2O$ was obtained. The hydrotalcite was suspended in water to yield an aqueous slurry of hydrotalcite (100 g/L).

Preparation of First Polycondensation Catalysts and Examples of Production of Polyester Using the Catalyst

Example 1

Preparation of Polycondensation Catalyst a 0.016 L of aqueous solution of titanium tetrachloride (69.2 g/L in terms of $TiO_2$) and 0.016 L of aqueous solution of sodium hydroxide (99.6 g/L in terms of NaOH) were prepared. 9.0 L of the aqueous slurry of magnesium hydroxide (123 g/L) obtained in Reference Example 1 was placed in a 25-L capacity reactor. Then, the aqueous solution of titanium tetrachloride and the aqueous solution of sodium hydroxide were added dropwise simultaneously to the aqueous slurry of magnesium hydroxide over 0.02 hours so that the aqueous slurry had a pH of 10.0. After completion of the addition, ageing was conducted for 1 hour and thereby a coat layer of titanic acid was formed on the surface of magnesium hydroxide particles.

The thus obtained aqueous slurry of magnesium hydroxide particles having on their surfaces a coat layer of titanic acid was filtered, washed with water, dried and then pulverized. Thus, polycondensation catalyst A of the invention was obtained. The content of titanic acid coat in the polycondensation catalyst, in terms of $TiO_2$, was 0.1 part by weight per 100 parts by weight of magnesium hydroxide.

Production of Polyester a 13.6 g (0.070 mol) of dimethyl terephthalate, 10.0 g (0.16 mol) of ethylene glycol, 0.022 g of calcium acetate dihydrate and 0.0012 g ($2.1\times10^{-5}$ mol; 0.03 part by mol per 100 parts by mol of dimethyl terephthalate) were placed in a glass reactor with a side pipe. Then, a part of the reactor was soaked in an oil bath at 197° C. so that the dimethyl terephthalate was dissolved in the ethylene glycol. A capillary was inserted into a reaction tube so that it reached the bottom of the reactor. While distilling most of resulting methanol by blowing nitrogen into the reactor' for 1 hour using this capillary, heating was continued for 2 hours to yield an oligomer containing BHET.

Subsequently, when heating at 222° C. was continued for 15 minutes, ethylene glycol started to be distilled and polycondensation started. Thereafter, the temperature was increased to 283° C. When this temperature was maintained, ethylene glycol was further distilled and the polycondensation progressed. Ten minutes later, the reduction of pressure was started and the pressure was reduced to 27 Pa or lower over 15 minutes. Then, the polycondensation was terminated in 3 hours. After the termination of the polycondensation reaction, the pressure in the reactor was returned to normal pressure with nitrogen gas. The resulting polyester was discharged in a strand form through an outlet opening at the bottom of the reactor. The strand was cooled and cut, yielding polyester pellets. The intrinsic viscosity, hue and haze value of the thus obtained polyester are shown in Table 1.

Example 2

Production of Polyester b 43 g (0.26 mol) of terephthalic acid and 19 g (0.31 mol) of ethylene glycol were placed in a reactor and stirred under a nitrogen atmosphere to prepare a slurry. An esterification reaction was performed over 4 hours while the temperature in the reactor was kept at 250° C. and the relative pressure based on the atmospheric pressure was kept at $1.2\times10^{-5}$ Pa. 50 g of the thus obtained low-molecular weight oligomer was transferred to a polycondensation reactor held at 250° C. and normal pressure under a nitrogen gas atmosphere.

A slurry was prepared by dispersing 0.0022 g ($3.9\times10^{-5}$ mol, 0.015 part by mol per 100 parts by mol of the terephthalic acid component subjected to the polycondensation) in ethylene glycol. Then, the slurry was added to the polycondensation reactor. Subsequently, the temperature in the reactor was increased from 250° C. to 280° C. over 3 hours. This temperature was maintained and the pressure was reduced from normal pressure to an absolute pressure of 40 Pa. While this pressure was maintained, heating was continued for additional two hours. Thus, a polycondensation reaction was carried out. After the termination of the polycondensation reaction, the pressure in the reactor was returned to normal pressure with nitrogen gas. The resulting polyester was discharged in a strand form through an outlet opening at the bottom of the reactor. The strand was cooled and cut, providing polyester pellets. The intrinsic viscosity, hue and haze value of the thus obtained polyester are shown in Table 1.

Example 3

Preparation of Polycondensation Catalyst B 0.16 L of aqueous solution of titanium tetrachloride (69.2 g/L in terms of $TiO_2$) and 0.16 L of aqueous solution of sodium hydroxide (99.6 g/L in terms of NaOH) were prepared. 9.0 L of the aqueous slurry of magnesium hydroxide (123 g/L) obtained in Reference Example 1 was placed in a 25-L capacity reactor. Then, the aqueous solution of titanium tetrachloride and the aqueous solution of sodium hydroxide were added dropwise simultaneously to the aqueous slurry of magnesium hydroxide over 0.2 hours so that the aqueous slurry had a pH of 10.0. After completion of the addition, ageing was conducted for 1 hour and thereby a coat layer of titanic acid was formed on the surface of magnesium hydroxide particles.

The thus obtained aqueous slurry of magnesium hydroxide particles having on their surfaces a coat layer of titanic acid was filtered, washed with water, dried and then pulverized. Thus, polycondensation catalyst B of the invention was obtained. The content of titanic acid coat in the polycondensation catalyst, in terms of $TiO_2$, was 1.0 part by weight per 100 parts by weight of magnesium hydroxide.

Production of Polyester c

The polycondensation catalyst B was used, and otherwise in the same manner as Example 1, polyester was obtained. The intrinsic viscosity, hue and haze value of the thus obtained polyester are shown in Table 1.

Example 4

Production of Polyester d

The polycondensation catalyst B was used, and otherwise in the same manner as Example 2, polyester was obtained. The intrinsic viscosity, hue and haze value of the thus obtained polyester are shown in Table 1.

Example 5

Preparation of Polycondensation Catalyst C 1.6 L of aqueous solution of titanium tetrachloride (69.2 g/L in terms of $TiO_2$) and 1.6 L of aqueous solution of sodium hydroxide (99.6 g/L in terms of NaOH) were prepared. 9.0 L of the aqueous slurry of magnesium hydroxide (123 g/L) obtained in Reference Example 1 was placed in a 25-L capacity reactor. Then, the aqueous solution of titanium tetrachloride and the aqueous solution of sodium hydroxide were dropwise added dropwise simultaneously to the aqueous slurry of magnesium hydroxide over 2 hours so that the aqueous slurry had a pH of 10.0. After completion of the addition, ageing was conducted for 1 hour and thereby a coat layer of titanic acid was formed on the surface of magnesium hydroxide particles.

The thus obtained aqueous slurry of magnesium hydroxide particles having on their surfaces a coat layer of titanic acid was filtered, washed with water, dried and then pulverized. Thus, polycondensation catalyst C of the invention was obtained. The content of titanic acid coat in the polycondensation catalyst, in terms of $TiO_2$, was 10 parts by weight per 100 parts by weight of magnesium hydroxide.

Production of Polyester e

The polycondensation catalyst C was used, and otherwise in the same manner as Example 1, polyester was obtained.

The intrinsic viscosity, hue and haze value of the thus obtained polyester are shown in Table 1.

Example 6

Production of Polyester f

The polycondensation catalyst C was used, and otherwise in the same manner as Example 2, polyester was obtained. The intrinsic viscosity, hue and haze value of the thus obtained polyester are shown in Table 1.

Example 7

Preparation of Polycondensation Catalyst D 3.2 L of aqueous solution of titanium tetrachloride (69.2 g/L in terms of $TiO_2$) and 3.2 L of aqueous solution of sodium hydroxide (99.6 g/L in terms of NaOH) were prepared. 9.0 L of the aqueous slurry of magnesium hydroxide (123 g/L) obtained in Reference Example 1 was placed in a 25-L capacity reactor. Then, the aqueous solution of titanium tetrachloride and the aqueous solution of sodium hydroxide were added dropwise simultaneously to the aqueous slurry of magnesium hydroxide over 4 hours so that the aqueous slurry had a pH of 10.0. After completion of the addition, ageing was conducted for 1 hour and thereby a coat layer of titanic acid was formed on the surface of magnesium hydroxide particles.

The thus obtained aqueous slurry of magnesium hydroxide particles having on their surfaces a coat layer of titanic acid was filtered, washed with water, dried and then pulverized. Thus, polycondensation catalyst D of the invention was obtained. The content of titanic acid coat in the polycondensation catalyst, in terms of $TiO_2$, was 20 parts by weight per 100 parts by weight of magnesium hydroxide.

Production of Polyester g

The polycondensation catalyst D was used, and otherwise in the same manner as Example 1, polyester was obtained. The intrinsic viscosity, hue and haze value of the thus obtained polyester are shown in Table 1.

Example 8

Production of Polyester h

The polycondensation catalyst D was used, and otherwise in the same manner as Example 2, polyester was obtained. The intrinsic viscosity, hue and haze value of the thus obtained polyester are shown in Table 1.

Example 9

Preparation of Polycondensation Catalyst E 8.0 L of aqueous solution of titanium tetrachloride (69.2 g/L in terms of $TiO_2$) and 8.0 L of aqueous solution of sodium hydroxide (99.6 g/L in terms of NaOH) were prepared. 9.0 L of the aqueous slurry of magnesium hydroxide (123 g/L) obtained in Reference Example 1 was placed in a 40-L capacity reactor. Then, the aqueous solution of titanium tetrachloride and the aqueous solution of sodium hydroxide were added dropwise simultaneously to the aqueous slurry of magnesium hydroxide over 10 hours so that the aqueous slurry had a pH of 10.0. After completion of the addition, ageing was conducted for 1 hour and thereby a coat layer of titanic acid was formed on the surface of magnesium hydroxide particles.

The thus obtained aqueous slurry of magnesium hydroxide particles having on their surfaces a coat layer of titanic acid was filtered, washed with water, dried and then pulverized. Thus, polycondensation catalyst E of the invention was obtained. The content of titanic acid coat in the polycondensation catalyst, in terms of $TiO_2$, was 50 parts by weight per 100 parts by weight of magnesium hydroxide.

Production of Polyester i

The polycondensation catalyst E was used, and otherwise in the same manner as Example 1, polyester was obtained. The intrinsic viscosity, hue and haze value of the thus obtained polyester are shown in Table 1.

Example 10

Production of Polyester j

The polycondensation catalyst D was used, and otherwise in the same manner as Example 2, polyester was obtained. The intrinsic viscosity, hue and haze value of the thus obtained polyester are shown in Table 1.

Example 11

Preparation of Polycondensation Catalyst F 0.07 L of aqueous solution of titanium tetrachloride (69.4 g/L in terms of $TiO_2$) and 0.07 L of aqueous solution of sodium hydroxide (100 g/L in terms of NaOH) were prepared. 5.0 L of the aqueous slurry of hydrotalcite (100 g/L) obtained in Reference Example 2 was placed in a 25-L capacity reactor. Then, the aqueous solution of titanium tetrachloride and the aqueous solution of sodium hydroxide were added dropwise simultaneously to the aqueous slurry of hydrotalcite over 0.2 hours so that the aqueous slurry had a pH of 9.0. After completion of the addition, ageing was conducted for 1 hour and thereby a coat layer of titanic acid was formed on the surface of hydrotalcite particles. The thus obtained aqueous slurry of hydrotalcite particles having on their surfaces a coat layer of titanic acid was filtered, washed with water, dried and then pulverized. Thus, polycondensation catalyst F of the invention was obtained. The content of titanic acid coat in the polycondensation catalyst, in terms of $TiO_2$, was 1.0 part by weight per 100 parts by weight of hydrotalcite.

Production of Polyester k

The polycondensation catalyst F was used, and otherwise in the same manner as Example 1, polyester was obtained. The intrinsic viscosity, hue and haze value of the thus obtained polyester are shown in Table 1.

Example 12

Production of Polyester l

The polycondensation catalyst F was used, and otherwise in the same manner as Example 2, polyester was obtained. The intrinsic viscosity, hue and haze value of the thus obtained polyester are shown in Table 1.

Example 13

Preparation of Polycondensation Catalyst G 0.72 L of aqueous solution of titanium tetrachloride (69.4 g/L in terms of $TiO_2$) and 0.72 L of aqueous solution of sodium hydroxide (100 g/L in terms of NaOH) were prepared. 5.0 L of the aqueous slurry of hydrotalcite (100 g/L) obtained in Reference Example 2 was placed in a 25-L capacity reactor. Then, the aqueous solution of titanium tetrachloride and the aqueous solution of sodium hydroxide were added dropwise simultaneously to the aqueous slurry of hydrotalcite over 2 hours so that the aqueous slurry had a pH of 9.0. After completion of the addition, ageing was conducted for 1 hour and thereby a coat layer of titanic acid was formed on the surface of hydrotalcite particles. The thus obtained aqueous slurry of hydrotalcite particles having on their surfaces a coat layer of titanic acid was filtered, washed with water, dried and then pulverized. Thus, polycondensation catalyst G of the invention was obtained. The content of titanic acid coat in the polycondensation catalyst, in terms of $TiO_2$, was 10 parts by weight per 100 parts by weight of hydrotalcite.

Production of Polyester m

The polycondensation catalyst G was used, and otherwise in the same manner as Example 1, polyester was obtained. The intrinsic viscosity, hue and haze value of the thus obtained polyester are shown in Table 1.

Example 14

Production of Polyester n

The polycondensation catalyst G was used, and otherwise in the same manner as Example 2, polyester was obtained. The intrinsic viscosity, hue and haze value of the thus obtained polyester are shown in Table 1.

Example 15

Preparation of Polycondensation Catalyst H 3.6 L of aqueous solution of titanium tetrachloride (69.4 g/L in terms of $TiO_2$) and 3.6 L of aqueous solution of sodium hydroxide (100 g/L in terms of NaOH) were prepared. 5.0 L of the aqueous slurry of hydrotalcite (100 g/L) obtained in Reference Example 2 was placed in a 25-L capacity reactor. Then, the aqueous solution of titanium tetrachloride and the aqueous solution of sodium hydroxide were added dropwise simultaneously to the aqueous slurry of hydrotalcite over 10 hours so that the aqueous slurry had a pH of 9.0. After completion of the addition, ageing was conducted for 1 hour and thereby a coat layer of titanic acid was formed on the surface of hydrotalcite particles. The thus obtained aqueous slurry of hydrotalcite particles having on their surfaces a coat layer of titanic acid was filtered, washed with water, dried and then pulverized. Thus, polycondensation catalyst H of the invention was obtained. The content of titanic acid coat in the polycondensation catalyst, in terms of $TiO_2$, was 50 parts by weight per 100 parts by weight of hydrotalcite.

Production of Polyester o

The polycondensation catalyst H was used, and otherwise in the same manner as Example 1, polyester was obtained. The intrinsic viscosity, hue and haze value of the thus obtained polyester are shown in Table 1.

Example 16

Production of Polyester p

The polycondensation catalyst H was used, and otherwise in the same manner as Example 2, polyester was obtained. The intrinsic viscosity, hue and haze value of the thus obtained polyester are shown in Table 1.

Comparative Example 1

Production of Polyester q

Polyester was obtained in the same manner as Example 1 except for using 0.0061 g ($2.1\times10^{-5}$ mol, 0.03 part by mol per 100 parts by mol of dimethyl terephthalate) of antimony trioxide instead of polycondensation catalyst A. The intrinsic viscosity, hue and haze value of the thus obtained polyester are shown in Table 1.

Comparative Example 2

Production of Polyester r

Polyester was obtained in the same manner as Example 2 except for using 0.0114 g ($3.9\times10^{-5}$ mol, 0.015 part by mol per 100 parts by mol of the terephthalic acid component subjected to polycondensation) of antimony trioxide instead of polycondensation catalyst A. The intrinsic viscosity, hue and haze value of the thus obtained polyester are shown in Table 1.

Comparative Example 3

Preparation of Titanic Acid 7.2 L of aqueous solution of titanium tetrachloride (69.4 g/L in terms of $TiO_2$) was prepared. After the aqueous solution of titanium tetrachloride was placed in a 25-L capacity reactor, an aqueous solution of sodium hydroxide was added dropwise to the aqueous titanium tetrachloride solution under stirring so that the resulting solution had a pH of 7.0. After completion of the addition, titanic acid was collected from the slurry by filtration, washed with water, and refiltered. Thus, a cake of titanic acid (33% by weight in terms of $TiO_2$) was obtained.

Production of Polyester s

Polyester was obtained in the same manner as Example 1 except for using 0.0051 g ($2.1\times10^{-5}$ mol in terms of $TiO_2$, 0.03 part by mol per 100 parts by mol of dimethyl terephthalate) of the foregoing titanic acid cake instead of polycondensation catalyst A. The intrinsic viscosity, hue and haze value of the thus obtained polyester are shown in Table 1.

Comparative Example 4

Production of Polyester t

Polyester was obtained in the same manner as Example 2 except for using 0.0093 g ($3.9\times10^{-5}$ mol in terms of $TiO_2$, 0.015 part by mol per 100 parts by mol of the terephthalic acid component subjected to polycondensation) of the titanic acid cake obtained in Comparative Example 3 instead of polycondensation catalyst A. The intrinsic viscosity, hue and haze value of the thus obtained polyester are shown in Table 1.

Comparative Example 5

Preparation of Mixture of Titanic Acid and Magnesium Hydroxide 9.0 L of the slurry of magnesium hydroxide (123 g/L) obtained in Reference Example 1 was placed in a 25-L capacity reactor. Then, 335 g of the titanic acid cake obtained in Comparative Example 3 (33% by weight in terms of $TiO_2$) was added thereto and the resulting mixture was stirred for 2 hours. After completion of stirring, ageing was conducted for 1 hour. A mixture was collected from the slurry by filtration, washed with water, dried and pulverized. Thus, a mixture of titanic acid and magnesium hydroxide was obtained. The content of titanic acid in this mixture, in terms of $TiO_2$, was 10 parts by weight per 100 parts by weight of magnesium hydroxide.

Production of Polyester u

Polyester was obtained in the same manner as Example 1 except for using 0.0013 g ($2.1\times10^{-5}$ mol, 0.03 part by mol per 100 parts by mol of dimethyl terephthalate) of the foregoing mixture of titanic acid and magnesium hydroxide instead of polycondensation catalyst A. The intrinsic viscosity, hue and haze value of the thus obtained polyester are shown in Table 1.

Comparative Example 6

Production of Polyester v

Polyester was obtained in the same manner as Example 2 except for using 0.0024 g ($3.9\times10^{-5}$ mol, 0.015 part by mol per 100 parts by mol of the terephthalic acid component subjected to polycondensation) of the mixture of titanic acid and magnesium hydroxide obtained in Comparative Example 5 instead of polycondensation catalyst A. The intrinsic viscosity, hue and haze value of the thus obtained polyester are shown in Table 1.

Comparative Example 7

Preparation of Mixture of Titanic Acid and Hydrotalcite 11.0 L of the aqueous slurry of hydrotalcite (100 g/L) obtained in Reference Example 2 was placed in a 25-L capacity reactor. Then, 334 g of the titanic acid cake obtained in Comparative Example 3 (33% by weight in terms of $TiO_2$) was added thereto and the resulting mixture was stirred for 2 hours. After completion of the stirring, ageing was conducted for 1 hour. A mixture was collected from the slurry by filtration, washed with water, dried and pulverized. Thus, a mixture of titanic acid and hydrotalcite was obtained. The content of titanic acid in this mixture, in terms of $TiO_2$, was 10 parts by weight per 100 parts by weight of hydrotalcite.

Production of Polyester w

Polyester was obtained in the same manner as Example 1 except for using 0.012 g ($2.1\times10^{-5}$ mol, 0.030 part by mol per 100 parts by mol of the terephthalic acid component subjected to polycondensation) of the mixture of titanic acid and hydrotalcite instead of polycondensation catalyst A. The intrinsic viscosity, hue and haze value of the thus obtained polyester are shown in Table 1.

Comparative Example 8

Production of Polyester x

Polyester was obtained in the same manner as Example 2 except for using 0.022 g ($3.9\times10^{-5}$ mol, 0.015 part by mol per 100 parts by mol of the terephthalic acid component subjected to polycondensation) of the mixture of titanic acid and hydrotalcite obtained in Comparative Example 7 instead of polycondensation catalyst A. The intrinsic viscosity, hue and haze value of the thus obtained polyester are shown in Table 1.

TABLE 1

| | Polyester | Polycondensation Catalyst | Intrinsic viscosity (dL/g) | Hue L-value | Hue a-value | Hue b-value | Haze value (%) |
|---|---|---|---|---|---|---|---|
| Example 1 | a | A | 0.65 | 90.2 | −2.6 | +1.8 | 4.5 |
| Example 2 | b | A | 0.60 | 92.1 | −2.1 | +1.6 | 4.3 |
| Example 3 | c | B | 0.62 | 89.4 | −2.8 | +1.9 | 4.4 |
| Example 4 | d | B | 0.66 | 89.7 | −2.5 | +1.6 | 4.6 |
| Example 5 | e | C | 0.68 | 94.4 | −2.0 | +1.4 | 4.2 |
| Example 6 | f | C | 0.66 | 94.0 | −2.2 | +1.8 | 4.1 |
| Example 7 | g | D | 0.62 | 91.4 | −2.7 | +1.9 | 4.5 |
| Example 8 | h | D | 0.63 | 92.2 | −2.4 | +1.2 | 4.4 |
| Example 9 | i | E | 0.59 | 89.1 | −3.1 | +1.9 | 4.9 |
| Example 10 | j | E | 0.58 | 89.6 | −2.9 | +1.7 | 4.8 |
| Example 11 | k | F | 0.70 | 93.7 | −2.0 | +1.1 | 3.6 |
| Example 12 | l | F | 0.71 | 89.4 | −2.1 | +1.4 | 4.0 |
| Example 13 | m | G | 0.72 | 91.3 | −1.9 | +1.1 | 3.8 |
| Example 14 | n | G | 0.69 | 89.8 | −2.0 | +1.2 | 3.8 |
| Example 15 | o | H | 0.68 | 90.3 | −2.2 | +1.3 | 4.2 |
| Example 16 | p | H | 0.67 | 88.8 | −2.3 | +1.4 | 3.9 |
| Comparative 1 | q | $Sb_2O_3$ | 0.72 | 91.0 | −2.2 | +1.9 | 4.0 |
| Comparative 2 | r | $Sb_2O_3$ | 0.69 | 90.3 | −2.3 | +1.9 | 4.3 |
| Comparative 3 | s | titanic acid | 0.38 | 64.7 | −3.1 | +12.5 | 19.3 |
| Comparative 4 | t | titanic acid | 0.41 | 64.8 | −3.5 | +13.0 | 18.3 |

TABLE 1-continued

| | Polyester | Polycondensation Catalyst | Intrinsic viscosity (dL/g) | Hue L-value | Hue a-value | Hue b-value | Haze value (%) |
|---|---|---|---|---|---|---|---|
| Comparative 5 | u | *1) | 0.35 | 51.7 | −2.9 | +10.5 | 13.3 |
| Comparative 6 | v | *1) | 0.40 | 51.3 | −2.4 | +10.2 | 12.7 |
| Comparative 7 | w | *2) | 0.65 | 72.3 | −2.7 | +9.5 | 9.9 |
| Comparative 8 | x | *2) | 0.59 | 75.3 | −3.1 | +9.2 | 10.6 |

(Notes)
*1) Mixture of titanic acid and magnesium hydroxide
*2) Mixture of titanic acid and hydrotalcite As is clear from the results shown in Table 1, polyesters having an intrinsic viscosity, hue and haze value almost comparable with those obtained using antimony trioxide as a polycondensation catalyst can be obtained according to the invention. On the other hand, when using titanic acid solely as a polycondensation catalyst, only polyesters having low intrinsic viscosities and also being inferior in hue and haze value are obtained. Even if a mixture of titanic acid with magnesium hydroxide or hydrotalcite is used as a polycondensation catalyst, resulting polyesters have low intrinsic viscosities and also have hues and haze values which are unsatisfactory.

Preparation of Second Polycondensation Catalysts and Examples of Production of Polyester Using the Catalyst In the polycondensation catalysts obtained in the following Examples, the amounts, in parts by weight per 100 parts by weight of a solid base, of silicon oxides, aluminum oxides and zirconium oxides are in terms of $SiO_2$, $Al_2O_3$ and $ZrO_2$, respectively. In the case of a complex oxide, when elements contained therein include silicon, aluminum and zirconium, the amounts thereof are calculated in terms of $SiO_2$, $Al_2O_3$ and $ZrO_2$.

Example 1

Preparation of Polycondensation Catalyst A 9.0 L of the aqueous slurry of magnesium hydroxide (123 g/L) obtained in Reference Example 1 was placed in a 25-L capacity reactor and then the temperature was increased to 60° C. While the temperature was maintained, 190.9 g of aqueous solution of sodium silicate (29% by weight in terms of $SiO_2$) was added. Further, sulfuric acid was added until the pH reached 8.5, followed by ageing for 1 hour. The resulting slurry was filtered and washed with water, thereby forming an inner coat layer of silicon oxide on the surface of magnesium hydroxide particles.

To the slurry of magnesium hydroxide particles having an inner coat layer thereon, 0.016 L of aqueous solution of titanium tetrachloride (69.2 g/L in terms of $TiO_2$) and 0.016 L of aqueous solution of sodium hydroxide (99.6 g/L in terms of NaOH) were dropwise added simultaneously over 0.02 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers was filtered, washed with water, dried and then pulverized. Thus, polycondensation catalyst A of the invention was obtained which had a silicon oxide inner coat layer in an amount of 5 parts by weight and a titanic acid outer coat layer in an amount of 0.1 parts by weight, per 100 parts by weight of magnesium hydroxide, respectively.

Production of Polyester a

In a glass reactor with a side pipe, 13.6 g (0.070 mol) of dimethyl terephthalate, 10.0 g (0.16 mol) of ethylene glycol, 0.022 g of calcium acetate dihydrate and 0.0013 g ($2.1\times10^{-5}$ mol; 0.03 part by mol per 100 parts by mol of dimethyl terephthalate) were placed and then a part of the reactor was soaked in an oil bath at 197° C. so that the dimethyl terephthalate was dissolved in the ethylene glycol. A capillary was inserted into a reaction tube so that it reached the bottom of the reactor. While distilling most of resulting methanol by blowing nitrogen into the reactor for 1 hour using this capillary, heating was continued for 2 hours to provide an oligomer containing BHET.

Subsequently, when heating at 222° C. was continued for 15 minutes, ethylene glycol started to be distilled and polycondensation started. Thereafter, the temperature was increased to 283° C. When this temperature was maintained, ethylene glycol was further distilled and the polycondensation progressed. Ten minutes later, the reduction of pressure was started and the pressure was reduced to 27 Pa or lower over 15 minutes. Then, the polycondensation was terminated in 3 hours.

After the termination of the polycondensation reaction, the pressure in the reactor was returned to normal pressure with nitrogen gas. The resulting polyester was discharged in a strand form through an outlet opening in the bottom of the reactor. The strand was cooled and cut, providing polyester pellets.

The intrinsic viscosity, hue and haze value of the thus obtained polyester are shown in Table 2.

Example 2

Production of Polyester b 43 g (0.26 mol) of terephthalic acid and 19 g (0.31 mol) of ethylene glycol were placed in a reactor and stirred under a nitrogen atmosphere to prepare a slurry. An esterification reaction was performed over 4 hours while the temperature in the reactor was kept at 250° C. and the relative pressure based on the atmospheric pressure was kept at $1.2\times10^{-5}$ Pa. 50 g of the thus obtained low-molecular weight oligomer was transferred to a polycondensation reactor held at 250° C. and normal pressure under a nitrogen gas atmosphere.

A slurry was prepared by dispersing 0.0024 g ($3.9\times10^{-5}$ mol, 0.015 part by mol per 100 parts by mol of the terephthalic acid component subjected to the polycondensation) in ethylene glycol, and the slurry was then charged into the polycondensation reactor. Subsequently, the temperature in the reactor was increased from 250° C. to 280° C. over 3 hours. This temperature was maintained and the pressure was reduced from normal pressure to an absolute pressure of 40 Pa over 1 hour. While this pressure was maintained, heating was continued for additional two hours. Thus, a polycondensation reaction was carried out. After the termination of the polycondensation reaction, the pressure in the reactor was returned to normal pressure with nitrogen gas. The resulting polyester was discharged in a strand form through an outlet opening in the bottom of the reactor. The strand was cooled and cut, yielding polyester pellets. The intrinsic viscosity, hue and haze value of the thus obtained polyester are shown in Table 2.

Example 3

Preparation of Polycondensation Catalyst B 9.0 L of the aqueous slurry of magnesium hydroxide (123 g/L) obtained in Reference Example 1 was placed in a 25-L capacity reactor and then the temperature was increased to 60° C. While the temperature was maintained, 381.8 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer of silicon oxide on the surface of magnesium hydroxide particles.

To the slurry of magnesium hydroxide particles having an inner coat layer thereon, 0.016 L of aqueous solution of titanium tetrachloride (69.2 g/L in terms of $TiO_2$) and 0.016 L of aqueous solution of sodium hydroxide (99.6 g/L in terms of NaOH) were added dropwise simultaneously over 0.02 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst B of the invention was obtained which had a silicon oxide inner coat layer in an amount of 10 parts by weight and a titanic acid outer coat layer in an amount of 0.1 part by weight, per 100 parts by weight of magnesium hydroxide, respectively.

Production of Polyester c

The polycondensation catalyst B was used, and otherwise in the same manner as Example 1, polyester was obtained. The intrinsic viscosity, hue and haze value of the thus obtained polyester are shown in Table 2.

Example 4

Production of Polyester d

The polycondensation catalyst B was used, and otherwise in the same manner as Example 2, polyester was obtained. The intrinsic viscosity, hue and haze value of the thus obtained polyester are shown in Table 2.

Example 5

Preparation of Polycondensation Catalyst C 9.0 L of the aqueous slurry of magnesium hydroxide (123 g/L) obtained in Reference Example 1 was placed in a 25-L capacity reactor and then the temperature was increased to 60° C. While the temperature was maintained, 190.9 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer of silicon oxide on the surface of magnesium hydroxide particles.

To the slurry of magnesium hydroxide particles having an inner coat layer thereon, 0.16 L of aqueous solution of titanium tetrachloride (69.2 g/L in terms of $TiO_2$) and 0.16 L of aqueous solution of sodium hydroxide (99.6 g/L in terms of NaOH) were added dropwise simultaneously over 0.2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst C of the invention was obtained which had a silicon oxide inner coat layer in an amount of 5 parts by weight and a titanic acid outer coat layer in an amount of 1 part by weight, per 100 parts by weight of magnesium hydroxide, respectively.

Production of Polyester e

The polycondensation catalyst C was used, and otherwise in the same manner as Example 1, polyester was obtained. The intrinsic viscosity, hue and haze value of the thus obtained polyester are shown in Table 2.

Example 6

Production of Polyester f

The polycondensation catalyst C was used, and otherwise in the same manner as Example 2, polyester was obtained. The intrinsic viscosity, hue and haze value of the thus obtained polyester are shown in Table 2.

Example 7

Preparation of Polycondensation Catalyst D 9.0 L of the aqueous slurry of magnesium hydroxide (123 g/L) obtained in Reference Example 1 was placed in a 25-L capacity reactor and then the temperature was increased to 60° C. While the temperature was maintained, 381.8 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer of silicon oxide on the surface of magnesium hydroxide particles.

To the slurry of magnesium hydroxide particles having an inner coat layer thereon, 0.16 L of aqueous solution of titanium tetrachloride (69.2 g/L in terms of $TiO_2$) and 0.16 L of aqueous solution of sodium hydroxide (99.6 g/L in terms of NaOH) were added dropwise simultaneously over 0.2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst D of the invention was obtained which had a silicon oxide inner coat layer in an amount of 10 parts by weight and a titanic acid outer coat layer in an amount of 1 part by weight, per 100 parts by weight of magnesium hydroxide, respectively.

Production of Polyester g

The polycondensation catalyst D was used, and otherwise in the same manner as Example 1, polyester was obtained. The intrinsic viscosity, hue and haze value of the thus obtained polyester are shown in Table 2.

Example 8

Production of Polyester h

The polycondensation catalyst D was used, and otherwise in the same manner as Example 2, polyester was obtained. The intrinsic viscosity, hue and haze value of the thus obtained polyester are shown in Table 2.

Example 9

Preparation of Polycondensation Catalyst E 9.0 L of the aqueous slurry of magnesium hydroxide (123 g/L) obtained in Reference Example 1 was placed in a 25-L capacity reactor and then the temperature was increased to 60° C. While the temperature was maintained, 38.2 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer of silicon oxide on the surface of magnesium hydroxide particles.

To the slurry of magnesium hydroxide particles having an inner coat layer thereon, 1.6 L of aqueous solution of titanium tetrachloride (69.2 g/L in terms of $TiO_2$) and 1.6 L of aqueous solution of sodium hydroxide (99.6 g/L in terms of NaOH) were added dropwise simultaneously over 2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst E of the invention was obtained which had a silicon oxide inner coat layer in an amount of 1 part by weight and a titanic acid outer coat layer in an amount of 10 parts by weight, per 100 parts by weight of magnesium hydroxide, respectively.

Production of Polyester i

The polycondensation catalyst E was used, and otherwise in the same manner as Example 1, polyester was obtained. The intrinsic viscosity, hue and haze value of the thus obtained polyester are shown in Table 2.

Example 10

Production of Polyester j

The polycondensation catalyst E was used, and otherwise in the same manner as Example 2, polyester was obtained. The intrinsic viscosity, hue and haze value of the thus obtained polyester are shown in Table 2.

Example 11

Preparation of Polycondensation Catalyst F 9.0 L of the aqueous slurry of magnesium hydroxide (123 g/L) obtained in Reference Example 1 was placed in a 25-L capacity reactor and then the temperature was increased to 60° C. While the temperature was maintained, 190.9 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer of silicon oxide on the surface of magnesium hydroxide particles.

To the slurry of magnesium hydroxide particles having an inner coat layer thereon, 1.6 L of aqueous solution of titanium tetrachloride (69.2 g/L in terms of $TiO_2$) and 1.6 L of aqueous solution of sodium hydroxide (99.6 g/L in terms of NaOH) were added dropwise simultaneously over 2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst F of the invention was obtained which had a silicon oxide inner coat layer in an amount of 5 parts by weight and a titanic acid outer coat layer in an amount of 10 parts by weight, per 100 parts by weight of magnesium hydroxide, respectively.

Production of Polyester k

The polycondensation catalyst F was used, and otherwise in the same manner as Example 1, polyester was obtained. The intrinsic viscosity, hue and haze value of the thus obtained polyester are shown in Table 2.

Example 12

Production of Polyester l

The polycondensation catalyst F was used, and otherwise in the same manner as Example 2, polyester was obtained. The intrinsic viscosity, hue and haze value of the thus obtained polyester are shown in Table 2.

Example 13

Preparation of Polycondensation Catalyst G 9.0 L of the aqueous slurry of magnesium hydroxide (123 g/L) obtained in Reference Example 1 was placed in a 25-L capacity reactor and then the temperature was increased to 60° C. While the temperature was maintained, 381.8 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer of silicon oxide on the surface of magnesium hydroxide particles.

To the slurry of magnesium hydroxide particles having an inner coat layer thereon, 1.6 L of aqueous solution of titanium tetrachloride (69.2 g/L in terms of $TiO_2$) and 1.6 L of aqueous solution of sodium hydroxide (99.6 g/L in terms of NaOH) were added dropwise simultaneously over 2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst G of the invention was obtained which had a silicon oxide inner coat layer in an amount of 10 parts by weight and a titanic acid outer coat layer in an amount of 10 parts by weight, per 100 parts by weight of magnesium hydroxide, respectively.

Production of Polyester m

The polycondensation catalyst G was used, and otherwise in the same manner as Example 1, polyester was obtained. The intrinsic viscosity, hue and haze value of the thus obtained polyester are shown in Table 2.

Example 14

Production of Polyester n

The polycondensation catalyst G was used, and otherwise in the same manner as Example 2, polyester was obtained. The intrinsic viscosity, hue and haze value of the thus obtained polyester are shown in Table 2.

Example 15

Preparation of Polycondensation Catalyst H 9.0 L of the aqueous slurry of magnesium hydroxide (123 g/L) obtained in Reference Example 1 was placed in a 25-L capacity reactor and then the temperature was increased to 60° C. While the temperature was maintained, 763.6 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer of silicon oxide on the surface of magnesium hydroxide particles.

To the slurry of magnesium hydroxide particles having an inner coat layer thereon, 1.6 L of aqueous solution of titanium tetrachloride (69.2 g/L in terms of $TiO_2$) and 1.6 L of aqueous solution of sodium hydroxide (99.6 g/L in terms of NaOH) were added dropwise simultaneously over 2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst H of the invention was obtained which had a silicon oxide inner coat layer in an amount of 20 parts by weight and a titanic acid outer coat layer in an amount of 10 parts by weight, per 100 parts by weight of magnesium hydroxide, respectively.

Production of Polyester o

The polycondensation catalyst H was used, and otherwise in the same manner as Example 1, polyester was obtained. The intrinsic viscosity, hue and haze value of the thus obtained polyester are shown in Table 2.

Example 16

Production of Polyester p

The polycondensation catalyst H was used, and otherwise in the same manner as Example 2, polyester was obtained. The intrinsic viscosity, hue and haze value of the thus obtained polyester are shown in Table 2.

Example 17

Preparation of Polycondensation Catalyst I 9.0 L of the aqueous slurry of magnesium hydroxide (123 g/L) obtained in Reference Example 1 was placed in a 25-L capacity reactor and then the temperature was increased to 60° C. While the temperature was maintained, 190.9 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer of silicon oxide on the surface of magnesium hydroxide particles.

To the slurry of magnesium hydroxide particles having an inner coat layer thereon, 3.2 L of aqueous solution of titanium tetrachloride (69.2 g/L in terms of $TiO_2$) and 3.2 L of aqueous solution of sodium hydroxide (99.6 g/L in terms of NaOH) were added dropwise simultaneously over 4 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst I of the invention was obtained which had a silicon oxide inner coat layer in an amount of 5 parts by weight and a titanic acid outer coat layer in an amount of 20 parts by weight, per 100 parts by weight of magnesium hydroxide, respectively.

Production of Polyester q

The polycondensation catalyst I was used, and otherwise in the same manner as Example 1, polyester was obtained. The intrinsic viscosity, hue and haze value of the thus obtained polyester are shown in Table 2.

Example 18

Production of Polyester r

The polycondensation catalyst I was used, and otherwise in the same manner as Example 2, polyester was obtained. The intrinsic viscosity, hue and haze value of the thus obtained polyester are shown in Table 2.

Example 19

Preparation of Polycondensation Catalyst J 9.0 L of the aqueous slurry of magnesium hydroxide (123 g/L) obtained in Reference Example 1 was placed in a 25-L capacity reactor and then the temperature was increased to 60° C. While the temperature was maintained, 190.9 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer of silicon oxide on the surface of magnesium hydroxide particles.

To the slurry of magnesium hydroxide particles having an inner coat layer thereon, 8.0 L of aqueous solution of titanium tetrachloride (69.2 g/L in terms of $TiO_2$) and 8.0 L of aqueous solution of sodium hydroxide (99.6 g/L in terms of NaOH) were added dropwise simultaneously over 10 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst J of the invention was obtained which had a silicon oxide inner coat layer in an amount of 5 parts by weight and a titanic acid outer coat layer in an amount of 50 parts by weight, per 100 parts by weight of magnesium hydroxide, respectively.

Production of Polyester s

The polycondensation catalyst J was used, and otherwise in the same manner as Example 1, polyester was obtained. The intrinsic viscosity, hue and haze value of the thus obtained polyester are shown in Table 2.

Example 20

Production of Polyester t

The polycondensation catalyst J was used, and otherwise in the same manner as Example 2, polyester was obtained. The intrinsic viscosity, hue and haze value of the thus obtained polyester are shown in Table 2.

Example 21

Preparation of Polycondensation Catalyst K 9.0 L of the aqueous slurry of magnesium hydroxide (123 g/L) obtained in Reference Example 1 was placed in a 25-L capacity reactor and then the temperature was increased to 60° C. While the temperature was maintained, 495.3 g of aqueous solution of sodium aluminate (19% by weight in terms of $Al_2O_3$) was added. Further, sulfuric acid was added until the pH of the slurry reached 8.5, followed by ageing for 1 hour. The resulting slurry was filtered and washed with water, thereby forming an inner coat layer of aluminum oxide on the surface of magnesium hydroxide particles.

To the slurry of magnesium hydroxide particles having an inner coat layer thereon, 1.6 L of aqueous solution of titanium tetrachloride (69.2 g/L in terms of $TiO_2$) and 1.6 L of aqueous solution of sodium hydroxide (99.6 g/L in terms of NaOH) were added dropwise simultaneously over 2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst K of the invention was obtained which had an aluminum oxide inner coat layer in an amount of 5 parts by weight and a titanic acid outer coat layer in an amount of 10 parts by weight, per 100 parts by weight of magnesium hydroxide, respectively.

Production of Polyester u

The polycondensation catalyst K was used, and otherwise in the same manner as Example 1, polyester was obtained. The intrinsic viscosity, hue and haze value of the thus obtained polyester are shown in Table 2.

Example 22

Preparation of Polycondensation Catalyst L 9.0 L of the aqueous slurry of magnesium hydroxide (123 g/L) obtained in Reference Example 1 was placed in a 25-L capacity reactor and then the temperature was increased to 60° C. While the temperature was maintained, 1136.7 g of aqueous solution of zirconium oxychloride (10% by weight in terms of $ZrO_2$) was added. Further, sodium hydroxide was added until the pH of the slurry reached 8.5, followed by ageing for 1 hour. The resulting slurry was filtered and washed with water, thereby forming an inner coat layer of zirconium oxide on the surface of magnesium hydroxide particles.

To the slurry of magnesium hydroxide particles having an inner coat layer thereon, 1.6 L of aqueous solution of titanium tetrachloride (69.2 g/L in terms of $TiO_2$) and 1.6 L of aqueous solution of sodium hydroxide (99.6 g/L in terms of NaOH) were added dropwise simultaneously over 2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst L of the invention was obtained which had a zirconium oxide inner coat layer in an amount of 5 parts by weight and a titanic acid outer coat layer in an amount of 10 parts by weight, per 100 parts by weight of magnesium hydroxide, respectively.

Production of Polyester v

The polycondensation catalyst L was used, and otherwise in the same manner as Example 1, polyester was obtained. The intrinsic viscosity, hue and haze value of the thus obtained polyester are shown in Table 2.

Example 23

Preparation of Polycondensation Catalyst M 9.0 L of the aqueous slurry of magnesium hydroxide (123 g/L) obtained in Reference Example 1 was placed in a 25-L capacity reactor and then the temperature was increased to 60° C. While the temperature was maintained, 95.5 g of aqueous solution of sodium silicate (29% by weight in terms of $SiO_2$) and 247.6 g of aqueous solution of sodium aluminate (19% by weight in terms of $Al_2O_3$) were added. Further, sulfuric acid was added until the pH of the slurry reached 8.5, followed by ageing for 1 hour. The resulting slurry was filtered and washed with water, thereby forming an inner coat layer of composite oxide of silicon and aluminum on the surface of magnesium hydroxide particles.

To the slurry of magnesium hydroxide particles having an inner coat layer thereon, 1.6 L of aqueous solution of titanium tetrachloride (69.2 g/L in terms of $TiO_2$) and 1.6 L of aqueous solution of sodium hydroxide (99.6 g/L in terms of NaOH) were added dropwise simultaneously over 2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst M of the invention was obtained which had an inner coat layer composed of composite oxide of silicon and aluminum in an amount of 5 parts by weight and a titanic acid outer coat layer in an amount of 10 parts by weight, per 100 parts by weight of magnesium hydroxide, respectively.

Production of Polyester w

The polycondensation catalyst M was used, and otherwise in the same manner as Example 1, polyester was obtained. The intrinsic viscosity, hue and haze value of the thus obtained polyester are shown in Table 2.

Example 24

Preparation of Polycondensation Catalyst N 9.0 L of the aqueous slurry of magnesium hydroxide (123 g/L) obtained in Reference Example 1 was placed in a 25-L capacity reactor and then the temperature was increased to 60° C. While the temperature was maintained, 95.5 g of aqueous solution of sodium silicate (29% by weight in terms of $SiO_2$) and 568.4 g of aqueous solution of zirconium oxychloride (10% by weight in terms of $ZrO_2$) were added, followed by ageing at a pH of 8.5 for 1 hour. The resulting slurry was filtered and washed with water, thereby forming an inner coat layer composed of composite oxide of silicon and zirconium on the surface of magnesium hydroxide particles.

To the slurry of magnesium hydroxide particles having an inner coat layer thereon, 1.6 L of aqueous solution of titanium tetrachloride (69.2 g/L in terms of $TiO_2$) and 1.6 L of aqueous solution of sodium hydroxide (99.6 g/L in terms of NaOH) were added dropwise simultaneously over 2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst N of the invention was obtained which had an inner coat layer composed of composite oxide of silicon and zirconium in an amount of 5 parts by weight and a titanic acid outer coat layer in an amount of 10 parts by weight, per 100 parts by weight of magnesium hydroxide, respectively.

Production of Polyester x

The polycondensation catalyst N was used, and otherwise in the same manner as Example 1, polyester was obtained. The intrinsic viscosity, hue and haze value of the thus obtained polyester are shown in Table 2.

Example 25

Preparation of Polycondensation Catalyst O 9.0 L of the aqueous slurry of magnesium hydroxide (123 g/L) obtained in Reference Example 1 was placed in a 25-L capacity reactor and then the temperature was increased to 60° C. While the temperature was maintained, 247.6 g of aqueous solution of sodium aluminate (19% by weight in terms of $Al_2O_3$) and 568.4 g of aqueous solution of zirconium oxychloride (10% by weight in terms of $ZrO_2$) were added, followed by ageing at a pH of 8.5 for 1 hour. The resulting slurry was filtered and washed with water, thereby forming an inner coat layer of composite oxide of aluminum and zirconium on the surface of magnesium hydroxide particles.

To the slurry of magnesium hydroxide particles having an inner coat layer thereon, 1.6 L of aqueous solution of titanium tetrachloride (69.2 g/L in terms of $TiO_2$) and 1.6 L of aqueous solution of sodium hydroxide (99.6 g/L in terms of NaOH) were added dropwise simultaneously over 2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst O of the invention was obtained which had an inner coat layer composed of composite oxide of aluminum and zirconium in an amount of 5 parts by weight and a titanic acid outer coat layer in an amount of 10 parts by weight, per 100 parts by weight of magnesium hydroxide, respectively.

Production of Polyester y

The polycondensation catalyst O was used, and otherwise in the same manner as Example 1, polyester was obtained. The intrinsic viscosity, hue and haze value of the thus obtained polyester are shown in Table 2.

Example 26

Preparation of Polycondensation Catalyst P 9.0 L of the aqueous slurry of magnesium hydroxide (123 g/L) obtained in Reference Example 1 was placed in a 25-L capacity reactor and then the temperature was increased to 60° C. While the temperature was maintained, 63.6 g of aqueous solution of sodium silicate (29% by weight in terms of $SiO_2$), 165.1 g of aqueous solution of sodium aluminate (19% by weight in terms of $Al_2O_3$) and 378.9 g of aqueous solution of zirconium oxychloride (10% by weight in terms of $ZrO_2$) were added, followed by ageing at a pH of 8.5 for 1 hour. The resulting slurry was filtered and washed with water, thereby forming an inner coat layer of composite oxide of silicon, aluminum and zirconium on the surface of magnesium hydroxide particles.

To the slurry of magnesium hydroxide particles having an inner coat layer thereon, 1.6 L of aqueous solution of titanium tetrachloride (69.2 g/L in terms of $TiO_2$) and 1.6 L of aqueous solution of sodium hydroxide (99.6 g/L in terms of NaOH) were added dropwise simultaneously over 2 hours so that the pH of the slurry reached 10.0. After completion of the addition, ageing was conducted for 1 hour and thereby an outer coat layer of titanic acid was formed on the inner coat layer.

The thus obtained aqueous slurry of magnesium hydroxide particles having an inner and outer coat layers thereon was filtered, washed with water, dried and then pulverized. Thus, polycondensation catalyst P of the invention was obtained which had an inner coat layer composed of composite oxide of silicon, aluminum and zirconium in an amount of 5 parts by weight and a titanic acid outer coat layer in an amount of 10 parts by weight, per 100 parts by weight of magnesium hydroxide, respectively.

Production of Polyester z

The polycondensation catalyst P was used, and otherwise in the same manner as Example 1, polyester was obtained. The intrinsic viscosity, hue and haze value of the thus obtained polyester are shown in Table 2.

Example 27

Preparation of Polycondensation Catalyst Q 5.0 L of the aqueous slurry of hydrotalcite (100 g/L) obtained in Reference Example 2 was placed in a 25-L capacity reactor and then the temperature was increased to 60° C. While the temperature was maintained, 86.2 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer composed of silicon oxide on the surface of hydrotalcite particles.

To the slurry of hydrotalcite particles having an inner coat layer thereon, 0.07 L of aqueous solution of titanium tetrachloride (69.4 g/L in terms of $TiO_2$) and 0.07 L of aqueous solution of sodium hydroxide (100 g/L in terms of NaOH) were added dropwise simultaneously over 0.2 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst Q of the invention was obtained which had an inner coat layer composed of silicon oxide in an amount of 5 parts by weight and a titanic acid outer coat layer in an amount of 1 part by weight, per 100 parts by weight of hydrotalcite, respectively.

Production of Polyester aa

The polycondensation catalyst Q was used, and otherwise in the same manner as Example 1, polyester was obtained. The intrinsic viscosity, hue and haze value of the thus obtained polyester are shown in Table 2.

Example 28

Production of Polyester ab

The polycondensation catalyst Q was used, and otherwise in the same manner as Example 2, polyester was obtained. The intrinsic viscosity, hue and haze value of the thus obtained polyester are shown in Table 2.

Example 29

Preparation of Polycondensation Catalyst R 5.0 L of the aqueous slurry of hydrotalcite (100 g/L) obtained in Reference Example 2 was placed in a 25-L capacity reactor and then the temperature was increased to 60° C. While the temperature was maintained, 172.4 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer composed of silicon oxide on the surface of hydrotalcite particles.

To the slurry of hydrotalcite particles having an inner coat layer thereon, 0.07 L of aqueous solution of titanium tetrachloride (69.4 g/L in terms of $TiO_2$) and 0.07 L of aqueous, solution of sodium hydroxide (100 g/L in terms of NaOH) were added dropwise simultaneously over 0.2 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst R of the invention was obtained which had an inner coat layer composed of silicon oxide in an amount of 10 parts by weight and a titanic acid outer coat layer in an amount of 1 part by weight, per 100 parts by weight of hydrotalcite, respectively.

Production of Polyester ac

The polycondensation catalyst R was used, and otherwise in the same manner as Example 1, polyester was obtained. The intrinsic viscosity, hue and haze value of the thus obtained polyester are shown in Table 2.

Example 30

Production of Polyester ad

The polycondensation catalyst R was used, and otherwise in the same manner as Example 2, polyester was obtained. The intrinsic viscosity, hue and haze value of the thus obtained polyester are shown in Table 2.

Example 31

Preparation of Polycondensation Catalyst S 5.0 L of the aqueous slurry of hydrotalcite (100 g/L) obtained in Reference Example 2 was placed in a 25-L capacity reactor and then the temperature was increased to 60° C. While the temperature was maintained, 17.2 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer composed of silicon oxide on the surface of hydrotalcite particles.

To the slurry of hydrotalcite particles having an inner coat layer thereon, 0.7 L of aqueous solution of titanium tetrachloride (69.4 g/L in terms of $TiO_2$) and 0.7 L of aqueous solution of sodium hydroxide (100 g/L in terms of NaOH) were added dropwise simultaneously over 2 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst S of the invention was obtained which had an inner coat layer composed of silicon oxide in an amount of 1 part by weight and a titanic acid outer coat layer in an amount of 10 parts by weight, per 100 parts by weight of hydrotalcite, respectively.

Production of Polyester ae

The polycondensation catalyst S was used, and otherwise in the same manner as Example 1, polyester was obtained. The intrinsic viscosity, hue and haze value of the thus obtained polyester are shown in Table 2.

Example 32

Production of Polyester af

The polycondensation catalyst S was used, and otherwise in the same manner as Example 2, polyester was obtained. The intrinsic viscosity, hue and haze value of the thus obtained polyester are shown in Table 2.

Example 33

Preparation of Polycondensation Catalyst T 5.0 L of the aqueous slurry of hydrotalcite (100 g/L) obtained in Reference Example 2 was placed in a 25-L capacity reactor and then the temperature was increased to 60° C. While the temperature was maintained, 86.2 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer composed of silicon oxide on the surface of hydrotalcite particles.

To the slurry of hydrotalcite particles having an inner coat layer thereon, 0.7 L of aqueous solution of titanium tetrachloride (69.4 g/L in terms of $TiO_2$) and 0.7 L of aqueous solution of sodium hydroxide (100 g/L in terms of NaOH) were added dropwise simultaneously over 2 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst T of the invention was obtained which had an inner coat layer composed of silicon oxide in an amount of 5 parts by weight and a titanic acid outer coat layer in an amount of 10 parts by weight, per 100 parts by weight of hydrotalcite, respectively.

Production of Polyester ag

The polycondensation catalyst T was used, and otherwise in the same manner as Example 1, polyester was obtained. The intrinsic viscosity, hue and haze value of the thus obtained polyester are shown in Table 2.

Example 34

Production of Polyester ah

The polycondensation catalyst T was used, and otherwise in the same manner as Example 2, polyester was obtained. The intrinsic viscosity, hue and haze value of the thus obtained polyester are shown in Table 2.

Example 35

Preparation of Polycondensation Catalyst U 5.0 L of the aqueous slurry of hydrotalcite (100 g/L) obtained in Reference Example 2 was placed in a 25-L capacity reactor and then the temperature was increased to 60° C. While the temperature was maintained, 172.4 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer composed of silicon oxide on the surface of hydrotalcite particles.

To the slurry of hydrotalcite particles having an inner coat layer thereon, 0.7 L of aqueous solution of titanium tetrachloride (69.4 g/L in terms of $TiO_2$) and 0.7 L of aqueous solution of sodium hydroxide (100 g/L in terms of NaOH) were added dropwise simultaneously over 2 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst U of the invention was obtained which had an inner coat layer composed of silicon oxide in an amount of 10 parts by weight and a titanic acid outer coat layer in an amount of 10 parts by weight, per 100 parts by weight of hydrotalcite, respectively.

Production of Polyester ai

The polycondensation catalyst U was used, and otherwise in the same manner as Example 1, polyester was obtained. The intrinsic viscosity, hue and haze value of the thus obtained polyester are shown in Table 2.

Example 36

Production of Polyester aj

The polycondensation catalyst U was used, and otherwise in the same manner as Example 2, polyester was obtained. The intrinsic viscosity, hue and haze value of the thus obtained polyester are shown in Table 2.

Example 37

Preparation of Polycondensation Catalyst V 5.0 L of the aqueous slurry of hydrotalcite (100 g/L) obtained in Reference Example 2 was placed in a 25-L capacity reactor and then the temperature was increased to 60° C. While the temperature was maintained, 86.2 g of aqueous solution of sodium silicate (29% by weight in terms of $SiO_2$) was added. Further, sulfuric acid was added until the pH of the slurry reached 8.5, followed by ageing for 1 hour. The resulting slurry was filtered and washed with water, thereby forming an inner coat layer composed of silicon oxide on the surface of hydrotalcite particles.

To the slurry of hydrotalcite particles having an inner coat layer thereon, 3.5 L of aqueous solution of titanium tetrachloride (69.4 g/L in terms of $TiO_2$) and 3.5 L of aqueous solution of sodium hydroxide (100 g/L in terms of NaOH) were added dropwise simultaneously over 10 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst V of the invention was obtained which had an inner coat layer composed of silicon oxide in an amount of 5 parts by weight and a titanic acid outer coat layer in an amount of 50 parts by weight, per 100 parts by weight of hydrotalcite, respectively.

Production of Polyester ak

The polycondensation catalyst V was used, and otherwise in the same manner as Example 1, polyester was obtained. The intrinsic viscosity, hue and haze value of the thus obtained polyester are shown in Table 2.

Example 38

Production of Polyester al

The polycondensation catalyst V was used, and otherwise in the same manner as Example 2, polyester was obtained. The intrinsic viscosity, hue and haze value of the thus obtained polyester are shown in Table 2.

Example 39

Preparation of Polycondensation Catalyst W 5.0 L of the aqueous slurry of hydrotalcite (100 g/L) obtained in Reference Example 2 was placed in a 25-L capacity reactor and then the temperature was increased to 60° C. While the temperature was maintained, 223.7 g of aqueous solution of sodium aluminate (19% by weight in terms of $Al_2O_3$) was added. Further, sulfuric acid was added until the pH of the slurry reached 8.5, followed by ageing for 1 hour. The resulting slurry was filtered and washed with water, thereby forming an inner coat layer composed of aluminum oxide on the surface of hydrotalcite particles.

To the slurry of hydrotalcite particles having an inner coat layer thereon, 0.7 L of aqueous solution of titanium tetrachloride (69.4 g/L in terms of $TiO_2$) and 0.7 L of aqueous solution of sodium hydroxide (100 g/L in terms of NaOH) were added dropwise simultaneously over 2 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst W of the invention was obtained which had an inner coat layer composed of aluminum oxide in an amount of 5 parts by weight and a titanic acid outer coat layer in an amount of 10 parts by weight, per 100 parts by weight of hydrotalcite, respectively.

Production of Polyester am

The polycondensation catalyst W was used, and otherwise in the same manner as Example 1, polyester was obtained. The intrinsic viscosity, hue and haze value of the thus obtained polyester are shown in Table 2.

Example 40

Preparation of Polycondensation Catalyst X 5.0 L of the aqueous slurry of hydrotalcite (100 g/L) obtained in Reference Example 2 was placed in a 25-L capacity reactor and then the temperature was increased to 60° C. While the temperature was maintained, 513.3 g of aqueous solution of zirconium oxychloride (10% by weight in terms of $ZrO_2$) was added. Further, sodium hydroxide was added until the pH of the slurry reached 8.5, followed by ageing for 1 hour. The resulting slurry was filtered and washed with water, thereby forming an inner coat layer composed of zirconium oxide on the surface of hydrotalcite particles.

To the slurry of hydrotalcite particles having an inner coat layer thereon, 0.7 L of aqueous solution of titanium tetrachloride (69.4 g/L in terms of $TiO_2$) and 0.7 L of aqueous solution of sodium hydroxide (100 g/L in terms of NaOH) were added dropwise simultaneously over 2 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst X of the invention was obtained which had an inner coat layer composed of zirconium oxide in an amount of 5 parts by weight and a titanic acid outer coat layer in an amount of 10 parts by weight, per 100 parts by weight of hydrotalcite, respectively.

Production of Polyester an

The polycondensation catalyst X was used, and otherwise in the same manner as Example 1, polyester was obtained. The intrinsic viscosity, hue and haze value of the thus obtained polyester are shown in Table 2.

Example 41

Preparation of Polycondensation Catalyst Y 5.0 L of the aqueous slurry of hydrotalcite (100 g/L) obtained in Reference Example 2 was placed in a 25-L capacity reactor and then the temperature was increased to 60° C. While the temperature was maintained, 43.1 g of aqueous solution of sodium silicate (29% by weight in terms of $SiO_2$) and 111.8 g of aqueous solution of sodium aluminate (19% by weight in terms of $Al_2O_3$) were added. Further, sulfuric acid was added until the pH of the slurry reached 8.5, followed by ageing for 1 hour. The resulting slurry was filtered and washed with water, thereby forming an inner coat layer composed of composite oxide of silicon and aluminum on the surface of hydrotalcite particles.

To the slurry of hydrotalcite particles having an inner coat layer thereon, 0.7 L of aqueous solution of titanium tetrachloride (69.4 g/L in terms of $TiO_2$) and 0.7 L of aqueous solution of sodium hydroxide (100 g/L in terms of NaOH) were added dropwise simultaneously over 2 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst Y of the invention was obtained which had an inner coat layer composed of composite oxide of silicon and aluminum in an amount of 5 parts by weight and a titanic acid outer coat layer in an amount of 10 parts by weight, per 100 parts by weight of hydrotalcite, respectively.

Production of Polyester ao

The polycondensation catalyst Y was used, and otherwise in the same manner as Example 1, polyester was obtained. The intrinsic viscosity, hue and haze value of the thus obtained polyester are shown in Table 2.

Example 42

Preparation of Polycondensation Catalyst Z 5.0 L of the aqueous slurry of hydrotalcite (100 g/L) obtained in Reference Example 2 was placed in a 25-L capacity reactor and then the temperature was increased to 60° C. While the temperature was maintained, 43.1 g of aqueous solution of sodium silicate (29% by weight in terms of $SiO_2$) and 256.7 g of aqueous solution of zirconium oxychloride (10% by weight in terms of $ZrO_2$) were added, followed by ageing at a pH of 8.5 for 1 hour. The resulting slurry was filtered and washed with water, thereby forming an inner coat layer composed of composite oxide of silicon and zirconium on the surface of hydrotalcite particles.

To the slurry of hydrotalcite particles having an inner coat layer thereon, 0.7 L of aqueous solution of titanium tetrachloride (69.4 g/L in terms of $TiO_2$) and 0.7 L of aqueous solution of sodium hydroxide (100 g/L in terms of NaOH) were added dropwise simultaneously over 2 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst Z of the invention was obtained which had an inner coat layer composed of composite oxide of silicon and zirconium in an amount of 5 parts by weight and a titanic acid outer coat layer in an amount of 10 parts by weight, per 100 parts by weight of hydrotalcite, respectively.

Production of Polyester ap

The polycondensation catalyst Z was used, and otherwise in the same manner as Example 1, polyester was obtained. The intrinsic viscosity, hue and haze value of the thus obtained polyester are shown in Table 2.

Example 43

Preparation of Polycondensation Catalyst AA 5.0 L of the aqueous slurry of hydrotalcite (100 g/L) obtained in Reference Example 2 was placed in a 25-L capacity reactor and then the temperature was increased to 60° C. While the temperature was maintained, 111.9 g of aqueous solution of sodium aluminate (19% by weight in terms of $Al_2O_3$) and 256.6 g of aqueous solution of zirconium oxychloride (10% by weight in terms of $ZrO_2$) were added, followed by ageing at a pH of 8.5 for 1 hour. The resulting slurry was filtered and washed with water, thereby forming an inner coat layer composed of composite oxide of aluminum and zirconium on the surface of hydrotalcite particles.

To the slurry of hydrotalcite particles having an inner coat layer thereon, 0.7 L of aqueous solution of titanium tetrachloride (69.4 g/L in terms of $TiO_2$) and 0.7 L of aqueous solution of sodium hydroxide (100 g/L in terms of NaOH) were added dropwise simultaneously over 2 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst AA of the invention was obtained which had an inner coat layer composed of composite oxide of aluminum and zirconium in an amount of 5 parts by weight and a titanic acid outer coat layer in an amount of 10 parts by weight, per 100 parts by weight of hydrotalcite, respectively.

Production of Polyester aq

The polycondensation catalyst AA was used, and otherwise in the same manner as Example 1, polyester was obtained. The intrinsic viscosity, hue and haze value of the thus obtained polyester are shown in Table 2.

Example 44

Preparation of Polycondensation Catalyst AB 5.0 L of the aqueous slurry of hydrotalcite (100 g/L) obtained in Reference Example 2 was placed in a 25-L capacity reactor and then the temperature was increased to 60° C. While the temperature was maintained, 28.7 g of aqueous solution of sodium silicate (29% by weight in terms of $SiO_2$), 74.6 g of aqueous solution of sodium aluminate (19% by weight in terms of $Al_2O_3$) and 171.1 g of aqueous solution of zirconium oxychloride (10% by weight in terms of $ZrO_2$) were added, followed by ageing at, a pH of 8.5 for 1 hour. The resulting slurry was filtered and washed with water, thereby forming an inner coat layer composed of composite oxide of silicon, aluminum and zirconium on the surface of hydrotalcite particles.

To the slurry of hydrotalcite particles having an inner coat layer thereon, 0.7 L of aqueous solution of titanium tetrachloride (69.4 g/L in terms of $TiO_2$) and 0.7 L of aqueous solution of sodium hydroxide (100 g/L in terms of NaOH) were added dropwise simultaneously over 2 hours so that the pH of the slurry reached 9.0. After completion of the addition, ageing was conducted for 1 hour and thereby an outer coat layer of titanic acid was formed on the inner coat layer.

The thus obtained aqueous slurry of hydrotalcite particles having an inner and outer coat layers thereon was filtered, washed with water, dried and then pulverized. Thus, polycondensation catalyst AB of the invention was obtained which had an inner coat layer composed of composite oxide of silicon, aluminum and zirconium in an amount of 5 parts by weight and a titanic acid outer coat layer in an amount of 10 parts by weight, per 100 parts by weight of hydrotalcite, respectively.

Production of Polyester ar

The polycondensation catalyst AB was used, and otherwise in the same manner as Example 1, polyester was obtained. The intrinsic viscosity, hue and haze value of the thus obtained polyester are shown in Table 2.

Comparative Example 1

Preparation of Mixture of Titanic Acid and Magnesium Hydroxide 7.2 L of aqueous solution of titanium tetrachloride (69.4 g/L in terms of $TiO_2$) was prepared. After the aqueous solution of titanium tetrachloride was placed in a 25-L capacity reactor, an aqueous solution of sodium hydroxide was added dropwise to the aqueous titanium tetrachloride solution under stirring so that the resulting solution had a pH of 7.0. After completion of the addition, titanic acid was collected from the slurry by filtration, washed with water, and refiltered. Thus, a cake of titanic acid (33% by weight in terms of $TiO_2$) was obtained.

9.0 L of the aqueous slurry of magnesium hydroxide (123 g/L) obtained in Reference Example 1 was placed in a 25-L capacity reactor. Then, 335 g of the titanic acid cake (33% by weight in terms of $TiO_2$) was added and stirred for 2 hours. After completion of the stirring, ageing was conducted for 1 hour. A mixture was collected from the slurry by filtration, washed with water, dried and pulverized. Thus, a mixture of titanic acid and magnesium hydroxide was obtained. The content of titanic acid in this mixture, in terms of $TiO_2$, was 10 parts by weight per 100 parts by weight of magnesium hydroxide.

Production of Polyester as

Polyester was obtained in the same manner as Example 1 except for using 0.0013 g ($2.1\times10^{-5}$ mol, 0.03 part by mol per 100 parts by mol of dimethyl terephthalate) of the foregoing mixture of titanic acid and magnesium hydroxide instead of polycondensation catalyst A. The intrinsic viscosity, hue and haze value of the thus obtained polyester are shown in Table 3.

Comparative Example 2

Production of Polyester at

Polyester was obtained in the same manner as Example 2 except for using 0.0024 g ($3.9\times10^{-5}$ mol, 0.015 part by mol per 100 parts by mol of the terephthalic acid component subjected to polycondensation) of the mixture of titanic acid and magnesium hydroxide obtained in Comparative Example 1 instead of polycondensation catalyst A. The intrinsic viscosity, hue and haze value of the thus obtained polyester are shown in Table 3.

Comparative Example 3

Preparation of Mixture of Titanic Acid and Hydrotalcite 11.0 L of the aqueous slurry of hydrotalcite (100 g/L) obtained in Reference Example 2 was placed in a 25-L capacity reactor. Then, 334 g of the titanic acid cake obtained in Comparative Example 1 (33% by weight in terms of $TiO_2$) was added and stirred for 2 hours. After completion of the stirring, ageing was conducted for 1 hour. A mixture was collected from the slurry by filtration, washed with water, dried and pulverized. Thus, a mixture of titanic acid and hydrotalcite was obtained. The content of titanic acid in this mixture, in terms of $TiO_2$, was 10 parts by weight per 100 parts by weight of hydrotalcite.

Production of Polyester au

Polyester was obtained in the same manner as Example 1 except for using 0.012 g ($2.1\times10^{-5}$ mol, 0.030 part by mol per 100 parts by mol of the terephthalic acid component subjected to polycondensation) of the mixture of titanic acid and hydrotalcite instead of polycondensation catalyst A. The intrinsic viscosity, hue and haze value of the thus obtained polyester are shown in Table 3.

Comparative Example 4

Production of Polyester av

Polyester was obtained in the same manner as Example 2 except for using 0.022 g ($3.9\times10^{-5}$ mol, 0.015 part by mol per 100 parts by mol of the terephthalic acid component subjected to polycondensation) of the mixture of titanic acid and hydrotalcite obtained in Comparative Example 3 instead of polycondensation catalyst A. The intrinsic viscosity, hue and haze value of the thus obtained polyester are shown in Table 3.

Comparative Example 5

Preparation of Mixture of Titanic Acid, Silicon Oxide and Magnesium Hydroxide 9.0 L of the slurry of magnesium hydroxide (123 g/L) obtained in Reference Example 1 was placed in a 25-L capacity reactor. Then, 110 g of silica (produced by Wako Junyaku Kogyo K.K.) and 335 g of the titanic acid cake obtained in Comparative Example 1 (33% by weight in terms of $TiO_2$) were added and stirred for 2 hours. After completion of the stirring, ageing was conducted for 1 hour. A mixture was collected from the slurry by filtration, washed with water, dried and pulverized. Thus, a mixture of titanic acid, silica and magnesium hydroxide was obtained.

Production of Polyester aw

Polyester was obtained in the same manner as Example 1 except for using 0.0013 g ($2.1\times10^{-5}$ mol, 0.03 part by mol per 100 parts by mol of dimethyl terephthalate) of the mixture of titanic acid, silica and magnesium hydroxide instead of polycondensation catalyst A. The intrinsic viscosity, hue and haze value of the thus obtained polyester are shown in Table 3.

Comparative Example 6

Preparation of Mixture of Titanic Acid, Silicon Oxide and Hydrotalcite 11.0 L of the slurry of hydrotalcite (100 g/L) obtained in Reference Example 2 was placed in a 25-L capacity reactor. Then, 110 g of silica (produced by Wako Junyaku Kogyo K.K.) and 334 g of the titanic acid cake obtained in Comparative Example 1 (33% by weight in terms of $TiO_2$) were added and stirred for 2 hours. After completion of the stirring, ageing was conducted for 1 hour. A mixture was collected from the slurry by filtration, washed with water, dried and pulverized. Thus, a mixture of titanic acid, silicon oxide and hydrotalcite was obtained.

Production of Polyester ax

Polyester was obtained in the same manner as Example 1 except for using 0.012 g ($2.1\times10^{-5}$ mol, 0.030 part by mol per 100 parts by mol of the terephthalic acid component subjected to polycondensation) of the mixture of titanic acid, silica and hydrotalcite instead of polycondensation catalyst A. The intrinsic viscosity, hue and haze value of the thus obtained polyester are shown in Table 3.

TABLE 2

| | Polyester | Polycondensation Catalyst | Intrinsic viscosity (dL/g) | Hue L-value | Hue a-value | Hue b-value | Haze value (%) |
|---|---|---|---|---|---|---|---|
| Example 1 | a | A | 0.68 | 91.5 | −2.5 | +1.4 | 4.1 |
| Example 2 | b | A | 0.70 | 90.2 | −2.5 | +1.6 | 4.0 |
| Example 3 | c | B | 0.59 | 89.4 | −2.1 | +1.4 | 3.8 |
| Example 4 | d | B | 0.59 | 93.5 | −2.0 | +1.3 | 3.7 |
| Example 5 | e | C | 0.69 | 90.3 | −2.4 | +1.3 | 3.7 |
| Example 6 | f | C | 0.70 | 93.5 | −2.3 | +1.5 | 4.2 |
| Example 7 | g | D | 0.66 | 92.4 | −1.9 | +1.5 | 4.0 |
| Example 8 | h | D | 0.64 | 93.8 | −2.1 | +1.3 | 3.9 |
| Example 9 | i | E | 0.73 | 92.8 | −2.5 | +1.6 | 3.8 |
| Example 10 | j | E | 0.72 | 89.0 | −2.6 | +1.5 | 4.2 |
| Example 11 | k | F | 0.68 | 92.7 | −2.1 | +1.7 | 4.1 |
| Example 12 | l | F | 0.72 | 94.0 | −2.0 | +1.5 | 3.8 |
| Example 13 | m | G | 0.65 | 90.9 | −2.4 | +1.5 | 4.0 |
| Example 14 | n | G | 0.64 | 92.9 | −2.5 | +1.7 | 3.8 |
| Example 15 | o | H | 0.71 | 91.9 | −2.1 | +1.6 | 4.1 |
| Example 16 | p | H | 0.67 | 93.8 | −2.1 | +1.2 | 4.0 |
| Example 17 | q | I | 0.73 | 94.4 | −2.1 | +1.3 | 3.7 |
| Example 18 | r | I | 0.71 | 89.0 | −2.2 | +1.5 | 4.0 |
| Example 19 | s | J | 0.59 | 93.3 | −2.0 | +1.6 | 4.1 |
| Example 20 | t | J | 0.67 | 89.7 | −2.4 | +1.3 | 3.8 |
| Example 21 | u | K | 0.64 | 89.7 | −2.1 | +1.6 | 4.1 |
| Example 22 | v | L | 0.66 | 90.7 | −1.9 | +1.7 | 4.1 |
| Example 23 | w | M | 0.68 | 90.3 | −2.0 | +1.8 | 3.9 |
| Example 24 | x | N | 0.61 | 89.2 | −2.4 | +1.8 | 4.1 |
| Example 25 | y | O | 0.64 | 91.4 | −1.9 | +1.7 | 4.0 |
| Example 26 | z | P | 0.65 | 89.4 | −2.1 | +1.7 | 4.2 |
| Example 27 | aa | Q | 0.73 | 89.9 | −2.4 | +1.3 | 4.0 |
| Example 28 | ab | Q | 0.68 | 93.9 | −2.4 | +1.4 | 3.9 |
| Example 29 | ac | R | 0.61 | 90.3 | −1.9 | +1.2 | 3.8 |
| Example 30 | ad | R | 0.59 | 89.3 | −2.0 | +1.3 | 4.1 |
| Example 31 | ae | S | 0.70 | 89.0 | −2.1 | +1.1 | 4.4 |
| Example 32 | af | S | 0.61 | 91.9 | −2.4 | +1.2 | 4.1 |
| Example 33 | ag | T | 0.62 | 90.9 | −2.3 | +1.1 | 4.2 |
| Example 34 | ah | T | 0.67 | 90.5 | −2.5 | +1.1 | 3.9 |
| Example 35 | ai | U | 0.60 | 92.3 | −2.2 | +1.3 | 3.9 |
| Example 36 | aj | U | 0.61 | 89.8 | −2.5 | +1.4 | 3.7 |
| Example 37 | ak | V | 0.73 | 90.7 | −2.1 | +1.2 | 4.0 |
| Example 38 | al | V | 0.64 | 89.4 | −2.4 | +1.3 | 3.8 |
| Example 39 | am | W | 67.00 | 90.5 | −2.3 | +1.5 | 4.1 |
| Example 40 | an | X | 0.66 | 90.2 | −2.5 | +1.4 | 3.9 |
| Example 41 | ao | Y | 0.67 | 89.5 | −2.5 | +1.1 | 3.9 |
| Example 42 | ap | Z | 0.65 | 90.1 | −2.2 | +1.1 | 3.9 |
| Example 43 | aq | AA | 0.61 | 89.7 | −2.1 | +1.7 | 4.2 |
| Example 44 | ar | AB | 0.62 | 91.0 | −2.5 | +1.4 | 4.3 |

TABLE 3

| | Polyester | Polycondensation Catalyst | Intrinsic viscosity (dL/g) | Hue L-value | Hue a-value | Hue b-value | Haze value (%) |
|---|---|---|---|---|---|---|---|
| Comparative 1 | as | *1) | 0.35 | 63.0 | −2.9 | +10.5 | 13.3 |
| Comparative 2 | at | *1) | 0.40 | 62.0 | −2.4 | +10.2 | 12.7 |

TABLE 3-continued

| | Polyester | Polycondensation Catalyst | Intrinsic viscosity (dL/g) | Hue L-value | Hue a-value | Hue b-value | Haze value (%) |
|---|---|---|---|---|---|---|---|
| Comparative 3 | au | *2) | 0.65 | 72.3 | −2.7 | +9.5 | 9.9 |
| Comparative 4 | av | *2) | 0.59 | 75.3 | −3.1 | +9.2 | 10.6 |
| Comparative 5 | aw | *3) | 0.34 | 60.0 | −2.5 | +10.7 | 13.1 |
| Comparative 6 | ax | *4) | 0.64 | 72.4 | −2.6 | +9.4 | 9.5 |

(Notes)
*1) Mixture of titanic acid and magnesium hydroxide
*2) Mixture of titanic acid and hydrotalcite
*3) Mixture of titanic acid, silicon compound and magnesium hydroxide
*4) Mixture of titanic acid, silicon compound and hydrotalcite

The invention claimed is:

1. A polycondensation catalyst for producing polyester by an esterification reaction or a transesterification reaction between a dicarboxylic acid or ester-forming derivative thereof and a glycol, wherein the polycondensation catalyst comprises particles of a solid base having on their surfaces a coat layer of titanic acid in an amount of from 0.1 to 50 parts by weight in terms of $TiO_2$ per 100 parts by weight of the solid base, and wherein the solid base is hydrotalcite.

2. A polycondensation catalyst for producing polyester by an esterification reaction or a transesterification reaction between a dicarboxylic acid or ester-forming derivative thereof and a glycol, wherein the polycondensation catalyst comprises particles of a solid base having on their surfaces an inner coat layer either of an oxide of at least one element selected from silicon, aluminum and zirconium or of a composite oxide of at least two elements selected from silicon, aluminum and zirconium in an amount of from 1 to 20 parts by weight per 100 parts by weight of the solid base and an outer coat layer of titanic acid in an amount of from 0.1 to 50 parts by weight in terms of $TiO_2$ per 100 parts by weight of the solid base, and wherein the solid base is hydrotalcite.

3. A method for producing the polycondensation catalyst according to claim 1, which comprises adding an aqueous solution of titanium halide and an aqueous alkaline solution to an aqueous slurry of particles of the solid base at a temperature of from 25 to 40° C. so that a pH of the aqueous slurry becomes 5 to 12 so as to form an outer coat layer of titanic acid on the surfaces of the particles of the solid base, drying the particles of the solid base with the outer coat layer, and pulverizing the particles.

4. A method for producing the polycondensation catalyst according to claim 2, which comprises, while maintaining an aqueous slurry of the particles of the solid base at a temperature of from 5 to 100° C., adding to the aqueous slurry a water-soluble silicate in an amount of from 1 to 20 parts by weight in terms of $SiO_2$ per 100 parts by weight of the solid base and/or a water-soluble aluminate in an amount of from 1 to 20 parts by weight in terms of $Al_2O_3$ per 100 parts by weight of the solid base and an acid so as to form an inner coat layer of an oxide of at least one element selected from silicon and aluminum or a composite oxide of silicon and aluminum on surfaces of the particles of the solid base; adding an aqueous solution of titanium halide and an aqueous alkaline solution to a resulting aqueous slurry of the particles of the solid base at a temperature of from 25 to 40° C. so that a pH of the aqueous slurry becomes 5 to 12 so as to form an outer coat layer of titanic acid on the inner coat layer; and drying and pulverizing the particles of the solid base with the inner and outer coat layers.

5. A method for producing the polycondensation catalyst according to claim 2, which comprises, while maintaining an aqueous slurry of the particles of the solid base at a temperature of from 5 to 100° C., adding to the aqueous slurry a water-soluble zirconium salt in an amount of from 1 to 20 parts by weight in terms of $ZrO_2$ per 100 parts by weight of the solid base and an alkali so as to form an inner coat layer of an oxide of zirconium on the surfaces of the particles of the solid base; adding an aqueous solution of titanium halide and an aqueous alkaline solution to a resulting aqueous slurry of the particles of the solid base at a temperature of from 25 to 40° C. so that a pH of the aqueous slurry becomes 5 to 12 so as to form an outer coat layer of titanic acid on the inner coat layer; and drying and pulverizing the particles of the solid base with the inner and outer coat layers.

6. A method for producing the polycondensation catalyst according to claim 2, which comprises, while maintaining an aqueous slurry of the particles of the solid base at a temperature of from 5 to 100° C., adding to the aqueous slurry a water-soluble zirconium salt in an amount of from 1 to 20 parts by weight per 100 parts by weight of the solid base, and a water-soluble silicate in an amount of from 1 to 20 parts by weight in terms of $SiO_2$ per 100 parts by weight of the solid base and/or aqueous aluminate in an amount of from 1 to 20 parts by weight in terms of $Al_2O_3$ per 100 parts by weight of the solid base so as to form an inner coat layer of a composite oxide of zirconium and at least one element selected from silicon and aluminum on the surfaces of the particles of the solid base; adding an aqueous solution of titanium halide and an aqueous alkaline solution to a resulting aqueous slurry of the particles of the solid base at a temperature of from 25 to 40° C. so that a pH of the aqueous slurry becomes 5 to 12 so as to form an outer coat layer of titanic acid on the inner coat layer; and drying and pulverizing the particles of the solid base with the inner and outer coat layers.

7. The method for producing the polycondensation catalyst according to claim 3, wherein the titanium halide is titanium tetrachloride.

8. The method for producing the polycondensation catalyst according to claim 4, wherein the titanium halide is titanium tetrachloride.

9. The method for producing the polycondensation catalyst according to claim 5, wherein the titanium halide is titanium tetrachloride.

10. The method for producing the polycondensation catalyst according to claim 6, wherein the titanium halide is titanium tetrachloride.

11. A method for producing a polyester comprising subjecting a dicarboxylic acid or an ester-forming derivative thereof and a glycol to an esterification reaction or a transesterification reaction in the presence of the polycondensation catalyst according to claim 1.

12. A method for producing a polyester comprising preparing an oligomer comprising a bis(hydroxyalkyl) ester of an aromatic dicarboxylic acid by an esterification reaction or a transesterification reaction of the aromatic dicarboxylic acid or an ester-forming derivative thereof and an alkylene glycol, and then melt-polycondensing the oligomer under a high vacuum at a high temperature in the presence of the polycondensation catalyst according to claim 1.

13. A method for producing a polyester comprising subjecting a dicarboxylic acid or an ester-forming derivative thereof and a glycol to an esterification reaction or a transesterification reaction in the presence of the polycondensation catalyst according to claim 2.

14. A method for producing a polyester comprising preparing an oligomer comprising a bis(hydroxyalkyl) ester of an aromatic dicarboxylic acid by an esterification reaction or a transesterification reaction of the aromatic dicarboxylic acid or an ester-forming derivative thereof and an alkylene glycol, and then melt-polycondensing the oligomer under a high vacuum at a high temperature in the presence of the polycondensation catalyst according to claim 2.

* * * * *